(12) United States Patent
Xue et al.

(10) Patent No.: US 11,197,286 B2
(45) Date of Patent: Dec. 7, 2021

(54) DOWNLINK CONTROL INFORMATION MONITORING METHOD, TERMINAL, AND BASE STATION

(71) Applicant: Huawei Technologies Co., Ltd., Shenzhen (CN)

(72) Inventors: Yifan Xue, Beijing (CN); Da Wang, Shenzhen (CN); Yun Liu, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 16/637,583

(22) PCT Filed: Aug. 8, 2017

(86) PCT No.: PCT/CN2017/096508
§ 371 (c)(1),
(2) Date: Feb. 7, 2020

(87) PCT Pub. No.: WO2019/028685
PCT Pub. Date: Feb. 14, 2019

(65) Prior Publication Data
US 2020/0260418 A1    Aug. 13, 2020

(51) Int. Cl.
*H04W 72/04* (2009.01)
*H04L 5/00* (2006.01)
*H04W 72/12* (2009.01)

(52) U.S. Cl.
CPC ........ *H04W 72/042* (2013.01); *H04L 5/0053* (2013.01); *H04W 72/0446* (2013.01); *H04W 72/0453* (2013.01); *H04W 72/1289* (2013.01)

(58) Field of Classification Search
CPC .............. H04L 5/0053; H04W 72/042; H04W 72/0446; H04W 72/0453; H04W 72/1289
(Continued)

(56) References Cited

U.S. PATENT DOCUMENTS 9,674,821 B2 * 6/2017 Ohta .................... H04W 76/28
2013/0294313 A1 11/2013 Han
(Continued)

FOREIGN PATENT DOCUMENTS

| CN | 102595568 A | 7/2012 |
| CN | 103582087 A | 2/2014 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.2.0, Mar. 2017, 330 pages.

(Continued)

*Primary Examiner* — Peter G Solinsky
(74) *Attorney, Agent, or Firm* — Conley Rose, P.C.

(57) ABSTRACT

A downlink control information monitoring method, a terminal, and a base station are applied to the field of communications technologies include monitoring, by the terminal, downlink control information in a first time resource unit range according to a first rule, and monitoring, by the terminal, downlink control information in a second time resource unit range according to a second rule, wherein the first time resource unit range is different from the second time resource unit range, and wherein the first rule is different from the second rule.

20 Claims, 19 Drawing Sheets

(58) Field of Classification Search
USPC .......................................................... 370/329
See application file for complete search history.

(56) References Cited

U.S. PATENT DOCUMENTS

| | | |
|---|---|---|
| 2016/0255612 A1 | 9/2016 | Sartori et al. |
| 2016/0360510 A1 | 12/2016 | Lee et al. |
| 2017/0238290 A1 | 8/2017 | Ohta |
| 2019/0045487 A1 | 2/2019 | You et al. |

FOREIGN PATENT DOCUMENTS

| | | |
|---|---|---|
| CN | 104350788 A | 2/2015 |
| CN | 106533633 A | 3/2017 |
| CN | 106656421 A | 5/2017 |
| CN | 106793123 A | 5/2017 |
| WO | 2010053330 A2 | 5/2010 |
| WO | 2013110372 A1 | 8/2013 |
| WO | 2015137719 A1 | 9/2015 |
| WO | 2017099526 A1 | 6/2017 |

OTHER PUBLICATIONS

HTC et al., "Clarification on DRX," 3GPP TSG-RAN2 Meeting #96, Reno, USA, Nov. 14-18, 2016, 3 pages.
"RAN1 Chairman's Notes," 3GPP TSG RAN WG1 Meeting #86bis, Lisbon, Portugal, Oct. 10-14, 2016, 113 pages.
"RAN1 Chairman's Notes," 3GPP TSG RAN WG1 NR Ad-Hoc#2, Qingdao, P.R. China, Jun. 27-30, 2017, 77 pages.

\* cited by examiner

DOWNLINK CONTROL INFORMATION MONITORING METHOD, TERMINAL, AND BASE STATION

CROSS-REFERENCE TO RELATED APPLICATIONS

This application is a U.S. National Stage of International Patent Application No. PCT/CN2017/096508 filed on Aug. 8, 2017, which is hereby incorporated by reference in its entirety.

TECHNICAL FIELD

This application relates to the field of communications technologies, and in particular, to a downlink control information monitoring method, a terminal, and a base station.

BACKGROUND

In a long term evolution (long term evolution, LTE) or new radio (new radio, NR) protocol, a packet-based data flow is usually bursty, and there is data transmission in a period of time, but there is no data transmission in a next relatively long period of time. When there is no data to be transmitted, power consumption may be reduced by stopping receiving a physical downlink control channel (physical downlink control channel, PDCCH), so as to increase a battery usage time. This is implemented by using discontinuous reception (discontinuous reception, DRX) in LTE. In LTE, a basic principle of DRX is that a discontinuous reception cycle is configured for UE in a radio resource control (radio resource control, RRC) connected mode. As shown in FIG. 2, a discontinuous reception DRX cycle includes an on duration "On Duration" period and an opportunity for DRX "Opportunity for DRX" period. In the on duration period, user equipment (user equipment, UE) monitors and receives a PDCCH, and in the opportunity for DRX period, the UE does not receive the PDCCH, to reduce power consumption.

In most cases, after UE is scheduled in a subframe and receives or sends data, it is likely that the UE continues to be scheduled in next several subframes, and if the UE does not receive or send the data but waits until a next discontinuous reception cycle, an additional latency is caused. To reduce such a latency, after being scheduled, the UE remains in an on duration period, that is, the UE continuously monitors a PDCCH in the configured on duration period. An implementation mechanism is as follows: Each time the UE is scheduled to initially transmit data, a DRX deactivation timer is started (or restarted), and the UE is always in an active mode until the timer expires. The DRX deactivation timer specifies a plurality of consecutive subframes including a PDCCH that indicates initially transmitted uplink or downlink user data, when the UE remains in the active mode after the UE successfully decodes the PDCCH. In other words, when the UE has data to be initially transmitted and is scheduled, the timer is started or restarted once.

During the LTE DRX, once the UE is in the active mode, the UE monitors a PDCCH in each downlink subframe including the PDCCH before the DRX deactivation timer expires. If a monitoring time specified for the DRX deactivation timer is excessively short, the UE can monitor only a relatively small quantity of PDCCHs. Once the DRX deactivation timer expires, the UE enters the opportunity for DRX period, and cannot receive or send data but wait until an on duration period of a next discontinuous reception cycle. If the monitoring time specified for the DRX deactivation timer is excessively long, the UE monitors a large quantity of PDCCHs, consuming a large amount of energy. In conclusion, the discontinuous reception cycle is not configured flexibly in the prior art, and there are technical problems that service efficiency is low if an excessively short on duration period is configured and service power consumption is excessively high if an excessively short on duration period is configured.

SUMMARY

The embodiments of this application provide a downlink control information monitoring method, a terminal, and a base station, so as to resolve prior-art technical problems that because a discontinuous reception cycle is not configured flexibly, service efficiency is low if an excessively short on duration period is configured and service power consumption is excessively high if an excessively short on duration period is configured.

According to a first aspect, this application provides a downlink control information monitoring method, where the method includes: monitoring, by a terminal, downlink control information in a first time resource unit range according to a first rule, and monitoring, by the terminal, downlink control information in a second time resource unit range according to a second rule, where the first time resource unit range is different from the second time resource unit range, and the first rule is different from the second rule.

In a possible design, that the first rule is different from the second rule includes:

a monitoring frequency for monitoring, by the terminal, the downlink control information in the first time resource unit range is different from a monitoring frequency for monitoring the downlink control information in the second time resource unit range;

an offset manner for monitoring, by the terminal, the downlink control information in the first time resource unit range is different from an offset manner for monitoring the downlink control information in the second time resource unit range; or the monitoring frequency and the offset manner for monitoring, by the terminal, the downlink control information in the first time resource unit range are respectively different from the monitoring frequency and the offset manner for monitoring the downlink control information in the second time resource unit range; where the monitoring frequency is a reciprocal of a time resource unit interval used to determine, from a plurality of time resource units corresponding to a time resource unit range, a time resource unit in which monitoring needs to be performed, and the offset manner is a manner of determining, from a plurality of time resource units corresponding to a time resource unit range, the first time resource unit in which monitoring needs to be performed.

In a possible design, that the first time resource unit range is different from the second time resource unit range includes:

a start moment of the first time resource unit range is different from a start moment of the second time resource unit range;

a time length of the first time resource unit range is different from a time length of the second time resource unit range; or the start moment and the time length of the first time resource unit range are respectively different from the start moment and the time length of the second time resource unit range.

In a possible design, the first time resource unit range includes a plurality of consecutive time resource units, the second time resource unit range includes a plurality of consecutive time resource units, and the time resource unit is one or a combination of a slot, a mini-slot, a symbol, and a subframe.

In a possible design, the method further includes:

when detecting, in a current time resource unit, downlink control information used to instruct the terminal to receive or send initially transmitted data, determining, by the terminal, the start moment and the time length of either of the first time resource unit range and the second time resource unit range.

In a possible design, the determining, by the terminal, the start moment and the time length of either of the first time resource unit range and the second time resource unit range includes:

determining, by the terminal, first configuration information, where the first configuration information is configured by the base station, or the first configuration information is preconfigured by the terminal, and the first configuration information configures a relative start moment and time length of either of the first time resource unit range and the second time resource unit range; and determining, by the terminal based on the current time resource unit and the first configuration information, the start moment and the time length of the either time resource unit range based on a plurality of consecutive time resource units after the current time resource unit.

In a possible design, the monitoring, by a terminal, downlink control information in a first time resource unit range according to a first rule includes:

determining, by the terminal, the offset manner and the monitoring frequency in the first time resource unit range, determining, by the terminal from the plurality of time resource units in the first time resource unit range based on the offset manner and the monitoring frequency in the first time resource unit range, a time resource unit in which monitoring needs to be performed, and monitoring, by the terminal in the time resource unit that includes a downlink control area and in which monitoring needs to be performed, the downlink control information sent by the base station to the terminal, where a symbol occupied by the downlink control area is used to carry the downlink control information; and the monitoring, by the terminal, downlink control information in a second time resource unit range according to a second rule includes:

determining, by the terminal, the offset manner and the monitoring frequency in the second time resource unit range, determining, by the terminal from the plurality of time resource units in the second time resource unit range based on the offset manner and the monitoring frequency in the second time resource unit range, a time resource unit in which monitoring needs to be performed, and monitoring, by the terminal in the time resource unit that includes a downlink control area and in which monitoring needs to be performed, the downlink control information sent by the base station to the terminal, where a symbol occupied by the downlink control area is used to carry the downlink control information.

In a possible design, the determining, by the terminal, the offset manner in either of the first time resource unit range and the second time resource unit range includes:

receiving, by the terminal, first indication information sent by the base station, where the first indication information indicates the offset manner in the either time resource unit range; and determining, by the terminal, the offset manner in the either time resource unit range according to the first indication information;

determining, by the terminal, the offset manner in the either time resource unit range based on a preconfiguration;

determining, by the terminal, the offset manner in the either time resource unit range based on a first function relationship that a radio network temporary identifier of the terminal meets, where the first function relationship is preconfigured by the terminal or the first function relationship is configured by the base station; or determining, by the terminal, the offset manner in the either time resource unit range based on a second function relationship that the radio network temporary identifier and a cell identity of the terminal meet, where the second function relationship is preconfigured by the terminal or the second function relationship is configured by the base station.

In a possible design, the determining, by the terminal, the monitoring frequency in either of the first time resource unit range and the second time resource unit range includes:

receiving, by the terminal, second indication information sent by the base station, where the second indication information indicates the monitoring frequency in the either time resource unit range; and determining, by the terminal, the monitoring frequency in the either time resource unit range according to the second indication information; or determining, by the terminal, the monitoring frequency in the either time resource unit range based on a preconfiguration.

In a possible design, when the start moment of the first time resource unit range is different from the start moment of the second time resource unit range, the monitoring frequency in the time resource unit range with a later start moment is lower than or equal to the monitoring frequency in the time resource unit range with an earlier start moment.

In a possible design, when the start moment of the first time resource unit range is the same as the start moment of the second time resource unit range, the monitoring frequency in an overlapping time resource unit range of the first time resource unit range and the second time resource unit range is higher than or equal to the monitoring frequency in a non-overlapping time resource unit range.

In a possible design, when the terminal re-detects, in either of the first time resource unit range and the second time resource unit range, downlink control information used to instruct the terminal to receive or send initially transmitted data, the terminal returns to the steps of monitoring, by the terminal, the downlink control information in the first time resource unit range according to the first rule, and monitoring, by the terminal, the downlink control information in the second time resource unit range according to the second rule.

In a possible design, the method further includes: receiving, by the terminal in either of the first time resource unit range and the second time resource unit range, third indication information sent by the base station, where the third indication information is used to instruct the terminal to stop monitoring downlink control information; and disconnecting, by the terminal, a radio frequency link between the terminal and the base station according to the third indication information, so that the terminal jumps from an active mode to a sleep mode;

disconnecting, by the terminal, the radio frequency link between the terminal and the base station according to the third indication information after the time resource unit range for receiving the third indication information expires, so that the terminal jumps from the active mode to the sleep mode; or disconnecting, by the terminal, the radio frequency link between the terminal and the base station according to the third indication information after a time resource unit range indicated by the base station expires, so that the terminal jumps from the active mode to the sleep mode.

In a possible design, the method further includes: receiving, by the terminal in any time resource unit in the first time resource unit range and the second time resource unit range, fourth indication information sent by the base station, where the fourth indication information is used to instruct the terminal to switch from the time resource unit to a third time resource unit range, a start moment of the third time resource unit range is the time resource unit, and the time length of the third time resource unit range and the monitoring frequency and the offset manner in the third time resource unit range are configured by the base station or preconfigured by the terminal; and determining, by the terminal according to the fourth indication information and the time resource unit, a time resource unit in which monitoring needs to be performed in the third time resource range; and monitoring, in the time resource unit in which monitoring needs to be performed in the third time resource range and that includes a downlink control area, downlink control information sent by the base station to the terminal.

In a possible design, the terminal switches to a short sleep mode in time resource units in which monitoring does not need to be performed in either of the first time resource unit range and the second time resource unit range, where the time resource units in which monitoring does not need to be performed include a time resource unit in the time resource unit range other than the time resource unit in which monitoring needs to be performed, and further include a time resource unit that does not include a downlink control area in the time resource unit in which monitoring needs to be performed.

In a possible design, the first time resource unit range is determined by using a first timer, and the second time resource unit range is determined by using a second timer.

In a possible design, the first time resource unit range is determined by using a first counter, and the second time resource unit range is determined by using a second counter.

According to a second aspect, this application provides a downlink control information monitoring method, where the method includes:

sending, by a base station, first configuration information to a terminal, where the first configuration information configures a relative start moment and time length of either of a first time resource unit range and a second time resource unit range, so that the terminal determines, based on a current time resource unit and the first configuration information, the start moment and the time length of the either time resource unit range based on a plurality of consecutive time resource units after the current time resource unit, and the terminal detects, in the current time resource unit, downlink control information used to instruct the terminal to receive or send initially transmitted data.

In a possible design, the method further includes:

sending, by the base station, first indication information to the terminal, where the first indication information indicates an offset manner in either of the first time resource unit range and the second time resource unit range, so that the terminal determines the offset manner in the either time resource unit range according to the first indication information; sending, by the base station to the terminal, a first function relationship that a radio network temporary identifier of the terminal meets, so that the terminal determines the offset manner in the either time resource unit range based on the first function relationship; or sending, by the base station to the terminal, a second function relationship that the radio network temporary identifier and a cell identity of the terminal meet, so that the terminal determines the offset manner in the either time resource unit range based on the second function relationship.

In a possible design, the method further includes:

sending, by the base station, second indication information to the terminal, where the second indication information is used to indicate, to the terminal, the monitoring frequency in either of the first time resource unit range and the second time resource unit range.

In a possible design, the method further includes:

sending, by the base station, third indication information to the terminal, where the third indication information is sent in either of the first time resource unit range and the second time resource unit range, and the third indication information is used to instruct the terminal to stop monitoring downlink control information.

In a possible design, the method further includes:

sending, by the base station, fourth indication information to the terminal, where the fourth indication information is sent in any time resource unit in the first time resource unit range and the second time resource unit range, and the fourth indication information is used to instruct the terminal to switch from the time resource unit to a third time resource unit range, a start moment of the third time resource unit range is the time resource unit, and the time length of the third time resource unit range and the monitoring frequency and the offset manner in the third time resource unit range are configured by the base station.

According to a third aspect, an embodiment of this application provides a terminal, where the terminal includes a memory, a transceiver, and a processor. The memory is configured to store an instruction. The processor is configured to execute the instruction stored in the memory, and control the transceiver to receive and send signals. When the processor executes the instruction stored in the memory, the terminal is configured to perform the method in any one of the first aspect and the designs of the first aspect.

According to a fourth aspect, an embodiment of this application provides a base station, where the base station includes a memory, a transceiver, and a processor. The memory is configured to store an instruction. The processor is configured to execute the instruction stored in the memory, and control the transceiver to receive and send signals. When the processor executes the instruction stored in the memory, the base station is configured to perform the method in any one of the second aspect and the designs of the second aspect.

According to a fifth aspect, an embodiment of this application provides a terminal, configured to implement the method in any one of the first aspect and the designs of the first aspect, and including corresponding functional modules configured to implement steps in the foregoing method.

According to a sixth aspect, an embodiment of this application provides a base station, configured to implement the method in any one of the second aspect and the designs of the second aspect, and including corresponding functional modules configured to implement steps in the foregoing method.

According to a seventh aspect, an embodiment of this application provides a computer-readable storage medium, where the computer-readable storage medium stores an instruction; and when the instruction is run on a computer, the computer is enabled to perform the method in any one of the first aspect and the possible implementations of the first aspect.

According to an eighth aspect, an embodiment of this application provides a computer-readable storage medium, where the computer-readable storage medium stores an instruction; and when the instruction is run on a computer, the computer is enabled to perform the method in any one of the second aspect and the possible implementations of the second aspect.

According to a ninth aspect, an embodiment of this application provides a computer program product including an instruction, and when the computer program product runs on a computer, the computer performs the method according to the first aspect or any possible implementation of the first aspect.

According to a tenth aspect, an embodiment of this application provides a computer program product including an instruction, and when the computer program product runs on a computer, the computer performs the method according to the second aspect or any possible implementation of the second aspect.

According to an eleventh aspect, this application provides a chip. The chip is connected to a memory, and is configured to read and execute a software program stored in the memory, so as to implement the method in any one of the first aspect and the possible designs of the first aspect.

According to a twelfth aspect, this application provides a chip. The chip is connected to a memory, and is configured to read and execute a software program stored in the memory, so as to implement the method in any one of the second aspect and the possible designs of the second aspect.

In the embodiments of this application, at least two time resource unit ranges are configured for the terminal to monitor downlink control information, and a time resource unit in which monitoring needs to be performed in each time resource unit range can be flexibly configured. The time resource unit in which monitoring needs to be performed in each time resource unit range may be some or all time resource units in the time resource unit range. Different rules are configured for the at least two time resource unit ranges to determine the time resource unit in which monitoring needs to be performed in each time resource unit range. Based on the foregoing configuration, time resource unit ranges with different lengths may be configured for the terminal based on a service requirement of the terminal, to ensure scheduling flexibility. In addition, a time resource unit in which monitoring needs to be performed in any time resource range is determined according to a rule, so as to avoid that monitoring needs to be performed in all time resource units in each time resource unit range, thereby reducing power consumption of the terminal. According to the foregoing downlink control information monitoring method in this application, scheduling flexibility can be ensured and power consumption of the terminal can be reduced.

DESCRIPTION OF EMBODIMENTS

The following further describes embodiments of this application in detail with reference to accompanying drawings.

Figure 1:
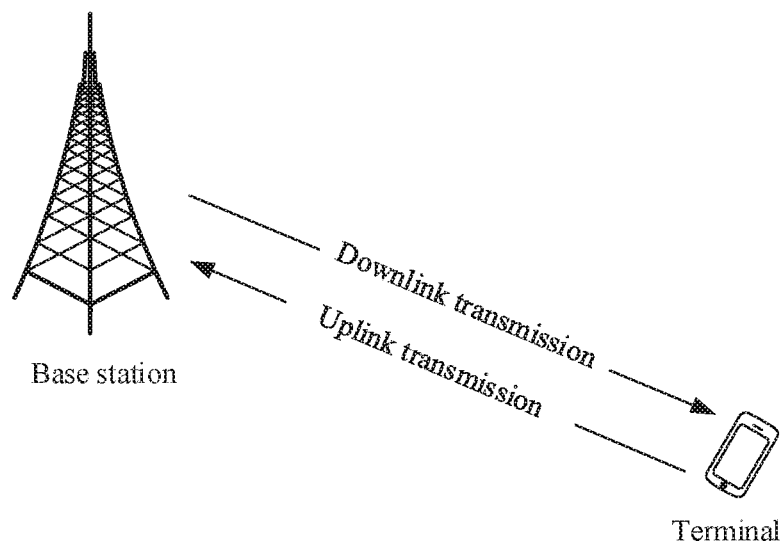
FIG. 1 is a schematic diagram of a system architecture according to an embodiment of this application.
Figure 2:
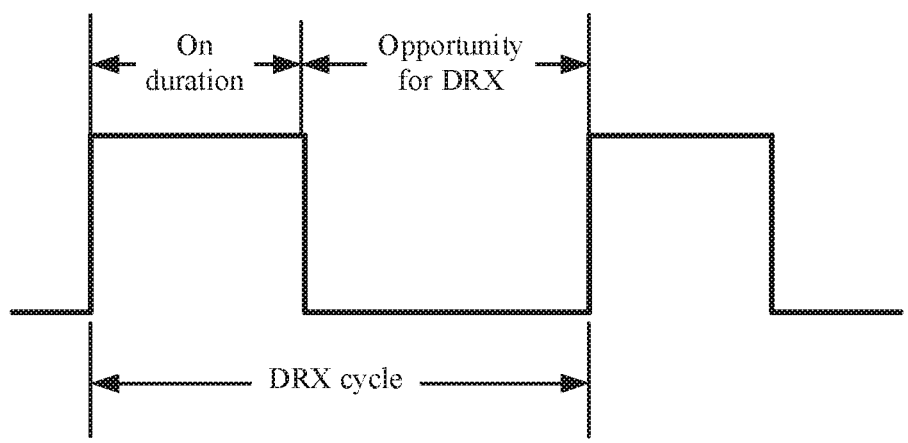
FIG. 2 is a schematic diagram of a DRX cycle according to an embodiment of this application.

This application is mainly applied to a long term evolution (Long Term Evolution, LTE for short)/5G new radio access technology (New RAT, NR for short) system. FIG. 1 shows a basic architecture of a communications system according to this application. A base station and a terminal may perform data or signaling transmission by using a wireless interface, including uplink transmission and downlink transmission.

The base station may be a device that can communicate with the terminal. The base station may be any device with a wireless transceiver function. The base station includes but is not limited to a base station (for example, a NodeB NodeB, an evolved NodeB eNodeB, a base station in a fifth generation (the fifth generation, 5G) communications system, a base station or a network device in a future communications system, or an access node, a wireless relay node, or a wireless backhaul node in a Wi-Fi system) and the like. Alternatively, the base station may be a radio controller in a cloud radio access network (cloud radio access network, CRAN) scenario. Alternatively, the base station may be a network device in a 5G network or a network device in a future evolved network, or may be a wearable device, a vehicle-mounted device, or the like. Alternatively, the base station may be a small cell, a transmission node (transmission reference point, TRP), or the like. Certainly, this application is not limited thereto.

The terminal is a device with a wireless transceiver function. The terminal may be deployed on land and includes an indoor or outdoor device, a hand-held device, a wearable device, or a vehicle-mounted device, may be deployed on a water surface (for example, a ship), or may be deployed in the air (for example, an airplane, a balloon, or a satellite). The terminal may be a mobile phone (mobile phone), a tablet computer (Pad), a computer with a wireless transceiver function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. Sometimes, the terminal may also be referred to as user equipment (user equipment, UE), an access terminal device, a UE unit, a UE station, a mobile site, a mobile station, a remote station, a remote terminal device, a mobile device, a UE terminal device, a terminal device, a wireless communications device, a UE agent, a UE apparatus, or the like.

It should be noted that the terms "system" and "network" in the embodiments of the present invention may be used interchangeably. "A plurality of" means two or more. In view of this, "a plurality of" may also be understood as "at least two" in the embodiments of the present invention. "And/or" describes an association relationship for describing associated objects and represents that three relationships may exist. For example, A and/or B may represent the following three cases: Only A exists, both A and B exist, and only B exists. In addition, the character "/", unless otherwise specified, generally indicates an "or" relationship between the associated objects. In addition, it should be understood that in the description of this application, words "first", "second", and the like are merely used for distinction description, and shall not be understood as an indication or implication of relative importance or an indication or implication of an order.

In the following, some terms in this application are described, so as to help a person skilled in the art have a better understanding.

A time domain resource unit described in the embodiments of this application is a time domain resource scheduling and allocation unit in a wireless communications system such as an LTE system, an LTE-Advanced system, or a 5G system such as NR, including but not limited to any one of a subframe, a subframe set, a slot (slot), a mini-slot (mini-slot), a transmit time interval (Transmit Time Interval, TTI for short), a TTI set, a time-domain symbol, and a time-domain symbol set. A term that is newly defined in a new radio access technology (New RAT, NR for short) or 5G and that is similar to the foregoing concept may also be used as the time domain resource unit described in this patent. This is not limited in this application.

A subframe in this application may be understood as follows: One subframe occupies a time-frequency resource in an entire system bandwidth in frequency domain and occupies a fixed time length in time domain, for example, one millisecond (ms). In addition, one subframe may alternatively occupy K consecutive symbols, where K is a natural number greater than 0. A value of K may be determined based on an actual situation, and this is not limited herein. For example, in LTE, one subframe occupies 14 consecutive OFDM symbols in time domain.

A slot in this application may be understood as follows: A slot is a basic time-frequency resource unit, and occupies L consecutive OFDM symbols in time domain, where L is a natural number greater than 0. A value of L may be determined based on an actual situation. For example, seven OFDM symbols may be occupied.

A symbol described in this application includes but is not limited to an orthogonal frequency division multiplexing (Orthogonal Frequency Division Multiplexing, OFDM) symbol, a sparse code multiple access (Sparse Code Multiplexing Access, SCMA) symbol, a filtered orthogonal frequency division multiplexing (Filtered Orthogonal Frequency Division Multiplexing, F-OFDM) symbol, and a non-orthogonal multiple access (Non-Orthogonal Multiple Access, NOMA) symbol. The symbol may be specifically determined based on an actual situation, and details are not described herein.

For short sleep described in this application, in LTE, the UE may achieve an objective of saving power by using a short sleep technology. After accessing a network, the UE needs to receive downlink data sent by the base station, or the UE sends uplink data to the base station. Regardless of whether the UE receives the downlink data or sends the uplink data, behavior of the UE is controlled by the base station. Specifically, the base station delivers downlink control information through a PDCCH, where the downlink control information may be used to schedule the UE to receive or send data. The UE blindly detects a PDCCH on a specific time-frequency resource according to some rules; and if the UE detects the PDCCH sent to the UE, the UE performs sending or receiving based on the downlink control information included in the PDCCH; or if the UE detects no PDCCH sent to the UE, the UE performs no further action. After the UE blindly detects a PDCCH in a downlink control area, if the UE detects no PDCCH sent to the UE, before a next downlink subframe arrives, the UE may turn off an RF link of the UE and enter a short opportunity for DRX period, thereby saving battery power. This power saving method is referred to as short sleep.

Figure 3:
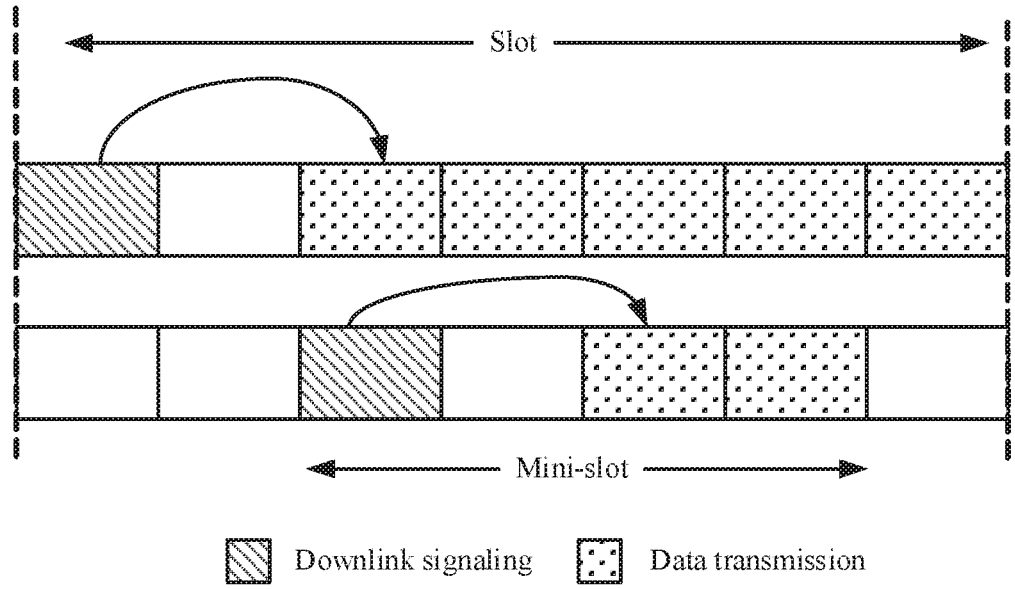
FIG. 3 is a schematic diagram of slot-based and mini-slot-based data transmission according to an embodiment of this application.

In this application, mini-slot-based transmission means that NR supports transmission based on both a slot (slot) and a mini-slot (mini-slot). As shown in FIG. 3, in NR, one slot is generally defined as n symbols (symbol), and one mini-slot is defined as 2 to n–1 symbols, where n is generally 7 or 14. Slot-based transmission means that a minimum scheduling unit in this transmission is one slot, and a minimum scheduling unit may be set to be shorter than one slot (that is, one mini-slot) for the mini-slot-based transmission. Generally, the mini-slot-based transmission may be used in a scenario in which a relatively short latency is required or a relatively small amount of data needs to be transmitted.

In NR, there are slot-based transmission and mini-slot-based transmission. Because a length of a mini-slot may be very short, there may be a plurality of mini-slots in one slot. If the UE needs to monitor all possible mini-slots, power consumption of the UE is excessively large. Therefore, in NR, a PDCCH monitoring occasion monitoring occasion is configured for the UE in time domain, and the UE monitors a PDCCH only on the configured PDCCH monitoring occasion. The PDCCH monitoring occasion includes a plurality of consecutive or inconsecutive time domain resource units, for example, a plurality of slots. A quantity of mini-slots that is in a slot and in which monitoring needs to be performed is also configured by the base station for the UE by using the PDCCH monitoring occasion. For example, a slot may include seven mini-slots that are respectively marked as 0 to 6. However, it is possible that the UE is configured to monitor only mini-slots 0, 3, and 6. In this case, for the UE, there may be three times of mini-slot-based transmission in the slot.

Figure 4:
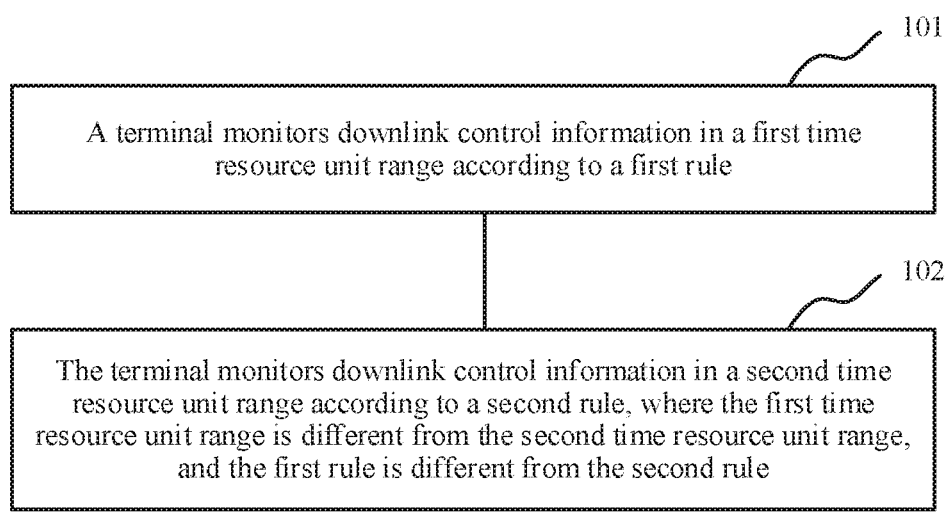
FIG. 4 is a method flowchart of a downlink control information monitoring method according to this application.

As shown in FIG. 4, a downlink control information monitoring method provided in this application includes the following steps:

Step 101: A terminal monitors downlink control information in a first time resource unit range according to a first rule.

Step 102: The terminal monitors downlink control information in a second time resource unit range according to a second rule.

The first time resource unit range is different from the second time resource unit range, and the first rule is different from the second rule.

It should be noted that step 101 and step 102 are simultaneously performed, or step 101 and step 102 are not simultaneously performed.

The first time resource unit range includes a plurality of consecutive time resource units. The second time resource unit range includes a plurality of consecutive time resource units. The time resource unit is one or a combination of a slot, a mini-slot, a symbol, and a subframe. A plurality of subframes, a plurality of slots, a plurality of mini-slots, or a plurality of symbols may be consecutive or inconsecutive. A combination of subframes, slots, mini-slots, or symbols may be consecutive or inconsecutive.

In a possible design, time resource unit ranges used for monitoring downlink control information include but are not limited to the first time resource unit range and the second time resource unit range. A plurality of time resource unit ranges are configured for monitoring downlink control information is configured for each time resource unit range, and the first time resource unit range and the second time resource unit range are two of the plurality of time resource unit ranges.

It should be noted that the first rule is used to specify a time resource unit in which monitoring needs to be performed in the first time resource unit range, and the time resource unit in which monitoring needs to be performed in the first time resource unit range is some or all time resource units in the first time resource unit range. The second rule specifies a time resource unit in which monitoring needs to be performed in the second time resource unit range, and the time resource unit in which monitoring needs to be performed in the second time resource unit range is some or all time resource units in the second time resource unit range.

It should be noted that the time resource unit in which monitoring needs to be performed in the first time resource unit range is determined based on a monitoring frequency and an offset manner in the first time resource unit range, and the time resource unit in which monitoring needs to be performed in the second time resource unit range is determined based on a monitoring frequency and an offset manner in the second time resource unit range. The monitoring frequency is a reciprocal of a time resource unit interval used to determine, from a plurality of time resource units corresponding to a time resource unit range, a time resource unit in which monitoring needs to be performed. For example, a time resource unit range includes 10 consecutive slots, and if monitoring is performed once every three slots, a monitoring frequency in the time resource unit range is 1/3. The offset manner is a manner of determining, from a plurality of time resource units corresponding to a time resource unit range, the first time resource unit in which monitoring needs to be performed. For example, a time resource unit range includes 10 consecutive slots, monitoring is performed once every three slots, and there may be a plurality of cases for the first slot in which monitoring is to be performed. The first slot in which monitoring is to be performed may be the first slot or may be the second slot. The manner of determining which slot is the first slot in which monitoring is to be performed is referred to as the offset manner.

In a possible design, that the first rule is different from the second rule includes: The monitoring frequency for monitoring, by the terminal, the downlink control information in the first time resource unit range is different from the monitoring frequency for monitoring the downlink control information in the second time resource unit range. In this case, the offset manner of the terminal in the first time resource unit range may be the same as or different from the offset manner in the second time resource unit range.

In a possible design, that the first rule is different from the second rule includes: The offset manner for monitoring, by the terminal, the downlink control information in the first time resource unit range is different from the offset manner for monitoring the downlink control information in the second time resource unit range. In this case, the monitoring frequency of the terminal in the first time resource unit range may be the same as or different from the monitoring frequency in the second time resource unit range.

In a possible design, that the first rule is different from the second rule includes: The monitoring frequency and the offset manner for monitoring, by the terminal, the downlink control information in the first time resource unit range are respectively different from the monitoring frequency and the offset manner for monitoring the downlink control information in the second time resource unit range.

It should be noted that a start moment of a time resource unit range is the first time resource unit in the corresponding time resource unit range, and a time length of the time resource unit range is a quantity of time resource units included in the corresponding time resource unit range. In a special case, if a time resource unit range includes at least two types of time resource units, a time length of the time resource unit range depends on a quantity of time resource units with a longer length. For example, a time resource unit range includes a plurality of consecutive slots, and one or more of the slots include at least one mini-slot, a time length of the time resource unit range depends on a quantity of the slots.

It should be noted that if step 101 and step 102 start to be simultaneously performed, a start moment of the first time resource unit range is the same as a start moment of the second time resource unit range, in other words, the first time resource unit in the first time resource unit range is the same as the first time resource unit in the second time resource unit range. If step 102 is started after step 101 ends, or step 101 is started after step 102 ends, or step 102 is started after a period of time after step 101 ends, the start moment of the first time resource unit range is different from the start moment of the second time resource unit range.

In a possible design, that the first time resource unit range is different from the second time resource unit range includes: The start moment of the first time resource unit range is different from the start moment of the second time resource unit range. In this case, a time length of the first time resource unit range may be the same as or different from a time length of the second time resource unit range.

In a possible design, that the first time resource unit range is different from the second time resource unit range includes: The time length of the first time resource unit range is different from the time length of the second time resource unit range. In this case, the start moment of the first time resource unit range may be the same as or different from the start moment of the second time resource unit range.

In a possible design, that the first time resource unit range is different from the second time resource unit range includes: The start moment and the time length of the first time resource unit range are respectively different from the time length and the start moment of the second time resource unit range.

In a possible design, the method further includes: when detecting, in a current time resource unit, downlink control information used to instruct the terminal to receive or send initially transmitted data, determining, by the terminal, the start moment and the time length of either of the first time resource unit range and the second time resource unit range. The current time resource unit may be any time resource unit in which monitoring needs to be performed in the first time resource unit range and the second time resource unit range. For example, the current time resource unit is any time resource unit that is in the first time resource unit and in which the downlink control information used to instruct the terminal to receive or send initially transmitted data is detected; or the current time resource unit is any time resource unit that is in the second time resource unit and in which the downlink control information used to instruct the terminal to receive or send initially transmitted data. The current time resource unit range may alternatively be any time resource unit that is configured for the terminal to monitor the downlink control information and that does not fall within the first time resource unit range and the second time resource unit range.

In a possible design, the determining, by the terminal, the start moment and the time length of either of the first time resource unit range and the second time resource unit range includes: determining, by the terminal, first configuration information, where the first configuration information is configured by the base station, or the first configuration information is preconfigured by the terminal, and the first configuration information configures a relative start moment and time length of either of the first time resource unit range and the second time resource unit range; and determining, by the terminal based on the current time resource unit and the first configuration information, the start moment and the time length of either of the first time resource unit range and the second time resource unit range based on a plurality of consecutive time resource units after the current time resource unit. It should be noted that the start moment of the either time resource unit range configured in the first configuration information is a relative value, that is, a relative start moment. In this way, each time downlink control information used to instruct the terminal to receive or send initially transmitted data is detected, the start moment and the time length of the either time resource unit range in which the terminal is enabled to remain in an active mode may be determined based on a moment at which the downlink control information is received and the first configuration information.

It should be noted that, if a quantity of time resource unit ranges that are configured for the terminal to monitor downlink control information is N, and N is a positive integer greater than 2, when the terminal detects, in a current time resource unit, downlink control information used to instruct the terminal to receive or send initially transmitted data, the terminal determines, based on the current time resource unit and the first configuration information, the start moment and the time length of any one of the N time resource unit ranges based on a plurality of consecutive time resource units after the current time resource unit. In this case, the first configuration information configures a relative start moment and time length of any one of the N time resource unit ranges.

In a possible design, step 101 specifically includes: determining, by the terminal, the offset manner and the monitoring frequency in the first time resource unit range; determining, by the terminal from the plurality of time resource units in the first time resource unit range based on the offset manner and the monitoring frequency in the first time resource unit range, a time resource unit in which monitoring needs to be performed; and monitoring, by the terminal in a time resource unit that includes a downlink control area and in which monitoring needs to be performed, downlink control information sent by the base station to the terminal, where a symbol occupied by the downlink control area is used to carry the downlink control information.

It should be noted that even if there is no downlink control area in the current time resource unit, the current time resource unit may still belong to the "time resource unit in which monitoring needs to be performed". Because the "time resource unit in which monitoring needs to be performed" is obtained according to a configuration or preconfiguration of the base station, whether a time resource unit has a downlink control area depends on a structure of the time resource unit, and the structure of the time resource unit is likely to be effective for a short time, when determining the "time resource unit in which monitoring needs to be performed", the terminal may not know whether the "time resource unit in which monitoring needs to be performed" includes a downlink control area.

In a possible design, step 102 specifically includes: determining, by the terminal, the offset manner and the monitoring frequency in the second time resource unit range; determining, by the terminal from the plurality of time resource units in the second time resource unit range based on the offset manner and the monitoring frequency in the second time resource unit range, a time resource unit in which monitoring needs to be performed; and monitoring, by the terminal in a time resource unit that includes a downlink control area and in which monitoring needs to be performed, downlink control information sent by the base station to the terminal, where a symbol occupied by the downlink control area is used to carry the downlink control information.

In a possible design, the determining, by the terminal, the offset manner in the either time resource unit range includes: receiving, by the terminal, first indication information sent by the base station, where the first indication information indicates the offset manner in the either time resource unit range, and determining, by the terminal, the offset manner in the either time resource unit range according to the first indication information.

In a possible design, the determining, by the terminal, the offset manner in the either time resource unit range used to monitor downlink control information includes: determining, by the terminal, the offset manner in the either time resource unit range based on a preconfiguration. The preconfiguration is a preconfiguration that is set at delivery in the terminal according to a standard protocol, and the preconfiguration includes the offset manner in the either time resource unit range used to monitor downlink control information.

In a possible design, the determining, by the terminal, the offset manner in the either time resource unit range used to monitor downlink control information includes: determining, by the terminal, the offset manner in the either time resource unit range based on a first function relationship that a radio network temporary identifier of the terminal meets, where the first function relationship is preconfigured by the terminal or the first function relationship is configured by the base station.

If monitoring is performed once every $m_i$ time resource units in a time resource unit range allocated to the terminal for monitoring downlink control information, the first function relationship that the radio network temporary identifier (radio network temporary identity, RNTI) of the terminal meets is RNTI mod $m_i$. For a terminal, if the RNTI of the terminal is 35542, a time resource unit range allocated to the terminal for monitoring downlink control information includes a plurality of consecutive slots, and monitoring is performed once every two slots, (35542 mod 2)=0 (mod is a modulo function) may be obtained through substitution in the first function relationship, that is, a slot in which monitoring needs to be performed by the terminal in the time resource unit range is an even slot. If the ID of the terminal is 24861, (24861 mod 2)=1, that is, a slot in which monitoring needs to be performed by the terminal in the time resource unit range is an odd slot.

In a possible design, the determining, by the terminal, the offset manner in the either time resource unit range used to monitor downlink control information includes: determining, by the terminal, the offset manner in the either time resource unit range based on a second function relationship that the radio network temporary identifier and a cell identity of the terminal meet.

If monitoring is performed once every $m_i$ time resource units in a time resource unit range allocated to the terminal for monitoring downlink control information, the second function relationship that the radio network temporary identifier RNTI and the cell identity (Cell ID) of the terminal meet is (RNTI+Cell ID) mod $m_i$. The second function relationship is preconfigured by the terminal, or the second function relationship is configured by the base station.

In a possible design, the determining, by the terminal, the monitoring frequency in the either time resource unit range includes: receiving, by the terminal, second indication information sent by the base station, where the second indication information indicates the monitoring frequency in the either time resource unit range, and determining, by the terminal, the monitoring frequency in the either time resource unit range according to the second indication information.

In a possible design, the determining, by the terminal, the monitoring frequency in the either time resource unit range includes: determining, by the terminal, the monitoring frequency in the either time resource unit range based on a preconfiguration.

In a possible design, when the start moment of the first time resource unit range is different from the start moment of the second time resource unit range, the monitoring frequency in the time resource unit range with a later start moment is lower than or equal to the monitoring frequency in the time resource unit range with an earlier start moment.

For example, three time resource unit ranges are configured for the terminal to monitor downlink control information, the second time resource unit range starts after monitoring in the first time resource unit range ends, and the third time resource unit range starts after monitoring in the second time resource unit range ends. Optionally, monitoring frequencies of the first time resource unit range, the second time resource unit range, and the third time resource unit range are in descending order. Optionally, monitoring frequencies of the three time resource unit ranges are the same, but offset manners of the three time resource unit ranges are different.

In a possible design, when the start moment of the first time resource unit range is the same as the start moment of the second time resource unit range, the monitoring frequency in an overlapping time resource unit range of the first time resource unit range and the second time resource unit range is higher than or equal to the monitoring frequency in a non-overlapping time resource unit range.

For example, two time resource unit ranges are configured for the terminal to monitor downlink control information, start moments of the two time resource unit ranges are the same, but time lengths of the two time resource unit ranges are different, and a time length of the first time resource unit range is less than a time length of the second time resource unit range. Optionally, monitoring is performed once in each time resource unit in an overlapping part of the first time resource unit range and the second time resource unit range, and monitoring is performed once every three time resource units in a non-overlapping part of the second time resource unit range and the first time resource unit range. Optionally, if monitoring frequencies of the two time resource unit ranges are equal, but offset manners of the two time resource unit ranges are different, it may be satisfied that the monitoring frequency in the overlapping part of the first time resource unit range and the second time resource unit range is equal to the monitoring frequency in the non-overlapping part.

In a possible design, when the terminal re-detect, in either of the first time resource unit range and the second time resource unit range, downlink control information used to instruct the terminal to receive or send initially transmitted data, the terminal returns to step 101 and step 102 in the foregoing embodiment.

In a possible design, the terminal receives, in either of the first time resource unit range and the second time resource unit range, third indication information sent by the base station, where the third indication information is used to instruct the terminal to stop monitoring downlink control information; and the terminal disconnects a radio frequency link between the terminal and the base station according to the third indication information, so that the terminal jumps from an active mode to a sleep mode; or the terminal disconnects the radio frequency link between the terminal and the base station according to the third indication information after the time resource unit range for receiving the third indication information expires, so that the terminal jumps from the active mode to the sleep mode; or the terminal disconnects the radio frequency link between the terminal and the base station according to the third indication information after a time resource unit range indicated by the base station expires, so that the terminal jumps from the active mode to the sleep mode.

In a possible design, the terminal receives, in any time resource unit in the first time resource unit range and the second time resource unit range, fourth indication information sent by the base station, where the fourth indication information is used to instruct the terminal to switch from the time resource unit to a third time resource unit range, a start moment of the third time resource unit range is the time resource unit, and the time length of the third time resource unit range and the monitoring frequency and the offset manner in the third time resource unit range are configured by the base station or preconfigured by the terminal; the terminal determines, according to the fourth indication information and the time resource unit, a time resource unit in which monitoring needs to be performed in the third time resource range; and the terminal monitors, in the time resource unit in which monitoring needs to be performed in the third time resource range and that includes a downlink control area, downlink control information sent by the base station to the terminal.

It should be noted that the third time resource unit range is a time resource unit range that is temporarily generated based on a preconfiguration or a configuration of the base station when the fourth indication information is received, a monitoring frequency and an offset manner of the third time resource unit range may be the same as a monitoring frequency and an offset manner of any time resource unit range configured for the terminal. Optionally, the monitoring frequency of the third time resource unit range is less than a monitoring frequency of a time resource unit range to which the current time resource unit for receiving the fourth indication information belongs.

In a possible design, the terminal switches to a short sleep mode in time resource units in which monitoring does not need to be performed in either of the first time resource unit range and the second time resource unit range, where the time resource units in which monitoring does not need to be performed include a time resource unit in the time resource unit range other than the time resource unit in which monitoring needs to be performed, and further include a time resource unit that does not include a downlink control area in the time resource unit in which monitoring needs to be performed.

Any indication information or configuration information described above in this application may be transmitted by using higher layer signaling. For example, the higher layer signaling may be radio resource control (radio resource control. RRC) signaling, master information block (Master Information Block, MIB) signaling, or system information block (System Information Block. SIB) signaling; or may be media access control (media access control, MAC) layer signaling, such as signaling carried by a MAC control element (MAC control element, MAC CE); or may be physical layer signaling, such as downlink control information (downlink control information, DCI); or may be a combination of the foregoing different signaling.

In a possible design, the first time resource unit range is determined by using a first timer, and the second time resource unit range is determined by using a second timer. If N time resource unit ranges are configured for the terminal, the N time resource unit ranges are implemented by using N timers. When start moments of the N time resource unit ranges are the same, the N timers are simultaneously started. When start moments of the N time resource unit ranges are different, the N timers are sequentially started. Optionally, after a timer corresponding to a time resource unit range whose start moment is earlier expires, a timer corresponding to a next time resource unit range is started, and an effective period of each timer depends on a time length of each resource unit range.

In a possible design, the first time resource unit range may alternatively be determined by using a first counter, and the second time resource unit range may alternatively be determined by using a second counter.

According to the downlink control information monitoring method on the terminal side, this application further provides a downlink control information monitoring method on a base station side. The method mainly includes:

sending, by a base station, first configuration information to a terminal, where the first configuration information configures a relative start moment and time length of either of a first time resource unit range and a second time resource unit range, so that when the terminal detects, in a current time resource unit, downlink control information used to instruct the terminal to receive or send initially transmitted data, the terminal determines, based on the current time resource unit and the first configuration information, the start moment and the time length of the either time resource unit range based on a plurality of consecutive time resource units after the current time resource unit.

In a possible design, the method further includes: sending, by the base station, first indication information to the terminal, where the first indication information indicates an offset manner in either of the first time resource unit range and the second time resource unit range, so that the terminal determines the offset manner in the either time resource unit range according to the first indication information; sending, by the base station, an instruction to the terminal, where the instruction indicates a first function relationship that a radio network temporary identifier of the terminal meets, so that the terminal determines the offset manner in the either time resource unit range based on the first function relationship; or sending, by the base station, an instruction to the terminal, where the instruction indicates a second function relationship that the radio network temporary identifier and a cell identity of the terminal meet, so that the terminal determines the offset manner in the either time resource unit range based on the second function relationship. For example, when a value indicated by the instruction sent by the base station to the terminal is 0, the terminal is instructed to determine the offset manner in the either time resource unit based on the first function relationship RNTI mod mi. When the value indicated by the instruction sent by the base station to the terminal is 1, the terminal is instructed to determine the offset manner in the either time resource unit based on the second function relationship (RNTI+Cell ID) mod mi.

In a possible design, the method further includes: sending, by the base station, second indication information to the terminal, where the second indication information is used to indicate, to the terminal, the monitoring frequency in either of the first time resource unit range and the second time resource unit range.

In a possible design, the method further includes: sending, by the base station, third indication information to the terminal, where the third indication information is sent in either of the first time resource unit range and the second time resource unit range, and the third indication information is used to instruct the terminal to stop monitoring downlink control information.

In a possible design, the method further includes: sending, by the base station, fourth indication information to the terminal, where the fourth indication information is sent in any time resource unit in the first time resource unit range and the second time resource unit range, and the fourth indication information is used to instruct the terminal to switch from the time resource unit to a third time resource unit range, a start moment of the third time resource unit range is the time resource unit, and the time length of the third time resource unit range and the monitoring frequency and the offset manner in the third time resource unit range are configured by the base station.

Any indication information or configuration information described above in this application may be transmitted by using higher layer signaling. For example, the higher layer signaling may be radio resource control (radio resource control, RRC) signaling, master information block (Master Information Block, MIB) signaling, or system information block (System Information Block, SIB) signaling; or may be media access control (media access control. MAC) layer signaling, such as signaling carried by a MAC control element (MAC control element, MAC CE); or may be physical layer signaling, such as downlink control information (downlink control information, DCI); or may be a combination of the foregoing different signaling.

In this application, at least two time resource unit ranges are configured for the terminal to monitor downlink control information, a time resource unit in which monitoring needs to be performed in each time resource unit range may be flexibly configured, and the time resource unit in which monitoring needs to be performed in each time resource unit range may be some or all time resource units in the time resource unit range. Different rules are configured for the at least two time resource unit ranges to determine the time resource unit in which monitoring needs to be performed in each time resource unit range. Based on the foregoing configuration, time resource unit ranges with different lengths may be configured for the terminal based on a service requirement of the terminal, to ensure scheduling flexibility. In addition, the time resource unit in which monitoring needs to be performed in each time resource range is determined according to a rule, so as to avoid that monitoring needs to be performed in all time resource units in each time resource unit range, thereby reducing power consumption of the terminal. According to the foregoing downlink control information monitoring method in this application, scheduling flexibility can be ensured and power consumption of the terminal can be reduced.

The following describes in detail the foregoing downlink control information monitoring method with reference to specific embodiments.

Figure 5:
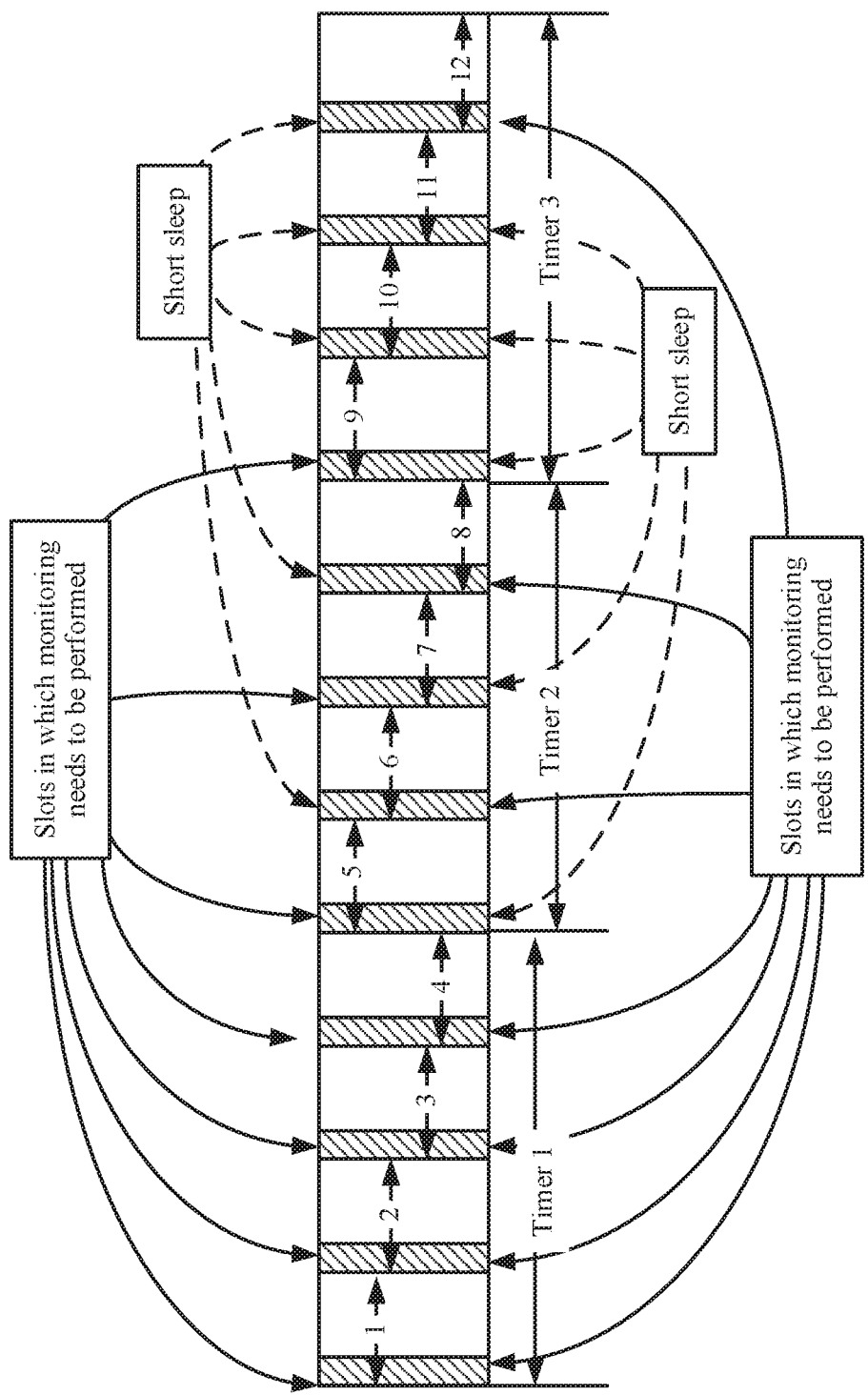
FIG. 5 and FIG. 6 are schematic diagrams of a downlink control information monitoring method according to Example 1 of this application.

Example 1 provided in this application is shown in FIG. 5. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, the $3^{rd}$ time resource unit range is implemented by a timer 3, and the UE is configured to perform slot-based transmission. The terminal is in an active mode during an effective period of any timer. A start moment of the timer 1 is the same as a start moment of the $1^{st}$ time resource unit range, and an effective period of the timer 1 is the same as a time length of the $1^{st}$ time resource unit range. A start moment of the timer 2 is the same as a start moment of the $2^{nd}$ time resource unit range, and an effective period of the timer 2 is the same as a time length of the $2^{nd}$ time resource unit range. A start moment of the timer 3 is the same as a start moment of the $3^{rd}$ time resource unit range, and an effective period of the timer 3 is the same as a time length of the $3^{rd}$ time resource unit range.

Each of the three time resource unit ranges includes four consecutive slots, each slot includes a downlink control area, and a symbol occupied by the downlink control area is used to carry downlink control information sent by the base station to the terminal. Monitoring is performed once in each slot in the $1^{st}$ time resource unit range, monitoring is performed once every two slots in the $2^{nd}$ time resource unit range, and monitoring is performed once every four slots in the $2^{nd}$ time resource unit range. There is a downlink control area in each slot. The timer 1, the timer 2, and the timer 3 are alternately started. The timer 1 is first started, the timer 2 is started when the timer 1 expires, and the timer 3 is started when the timer 2 expires. After the timer 1, the timer 2, and the timer 3 all expire, the terminal jumps from the active mode to a sleep mode.

It should be noted that, each time resource unit range includes four slots including downlink control areas, and duration of each time resource unit range is a relative value. Therefore, in this example, the timer may be replaced with a counter. In other words, each time resource unit range is corresponding to one counter.

According to the foregoing configuration, performing, by the terminal, the downlink control information monitoring method specifically includes the following:

After the terminal successfully performs initial transmission of uplink data or downlink data once, or detects, in any time resource unit range, downlink control information used to instruct the terminal to receive or send initially transmitted data, the timer 1 is started, and in the four slots in which the timer 1 is effective, the terminal monitors a PDCCH once in each slot. After the timer 1 expires, the timer 2 is started, and in the four slots in which the timer 2 is effective, the terminal monitors a PDCCH once every two slots. Because the terminal does not monitor a PDCCH in each slot in which the timer 2 is effective, there may be different offset manners for the terminal to monitor a PDCCH in a specific slot. As shown in FIG. 5, in the four slots in which the timer 2 is effective, the terminal may perform monitoring in the fifth slot and the seventh slot, or may perform monitoring in the sixth slot and the eighth slot. After the timer 2 expires, the timer 3 is started. In the four slots in which the timer 3 is effective, the terminal monitors a PDCCH once every four slots. Similarly, because the terminal does not monitor a PDCCH in each slot in which the timer 3 is effective, there may be different offset manners for the terminal to monitor a PDCCH in a specific slot. In the four slots in which the timer 3 is effective, the terminal may perform monitoring in the ninth slot, or perform monitoring in the twelfth slot. When the terminal performs monitoring in the fifth and the seventh slots in which the timer 2 is effective, the terminal may turn off an RF link in the sixth and the eighth slots and enter the short sleep mode to save power. When the terminal performs monitoring in the ninth slot in which the timer 3 is effective, the terminal may turn off the RF link in the tenth, the eleventh, and the twelfth slots and enter the short sleep mode to save power. Similarly, when the terminal performs monitoring in the sixth and the eighth slots in which the timer 2 is effective, the terminal may turn off the RF link in the fifth and the seventh slots and enter the short sleep mode to save power. When the terminal performs monitoring in the twelfth slot in which the timer 3 is effective, the terminal may turn off the RF link in the ninth, the tenth, and the eleventh slots and enter the short sleep mode to save power.

The offset manner in which the terminal monitors a PDCCH may be configured by the base station for the terminal by using RRC signaling, or configured by the base station for the terminal by using an MAC CE, or configured by the base station for the terminal by using DCI, or obtained through calculation based on a radio network temporary identifier RNTI of the terminal, or obtained through calculation based on the RNTI of the terminal and a Cell ID of a cell. For specific content, refer to the foregoing content. Details are not described herein again.

Figure 6:
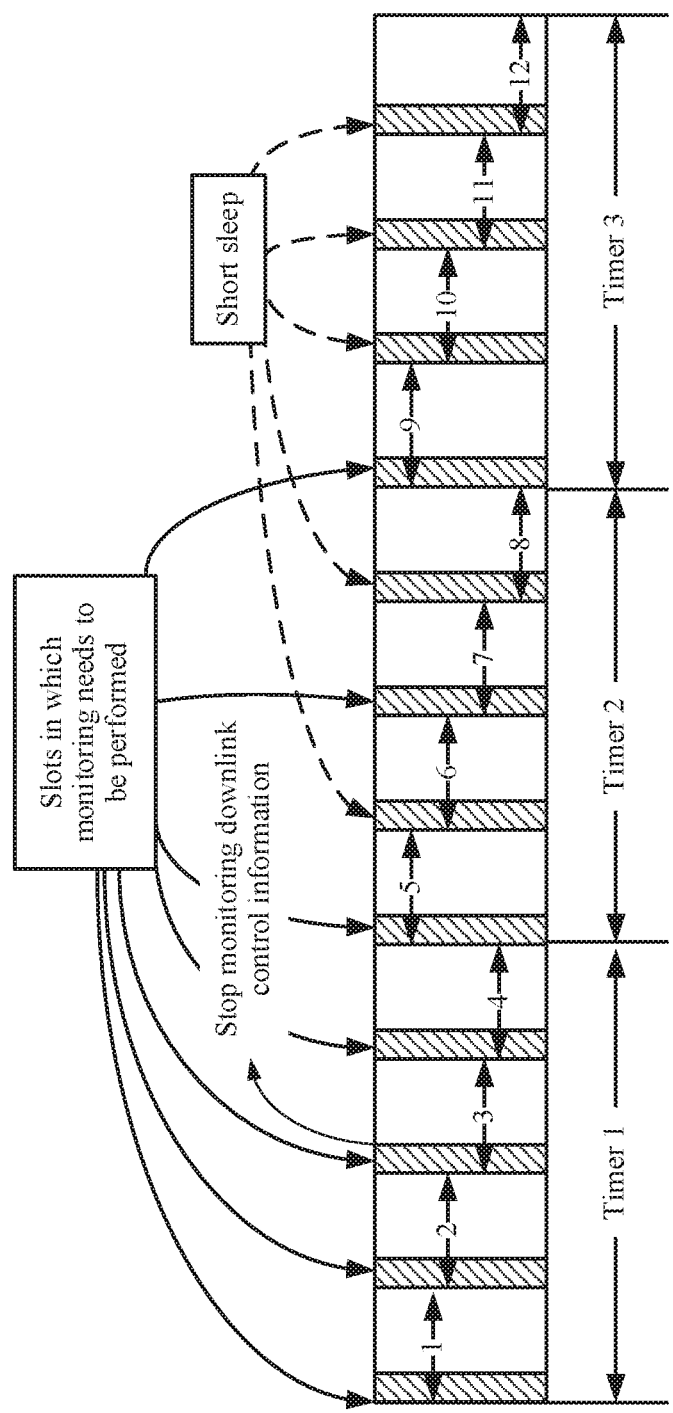

In an effective period of any timer in the foregoing method procedure, the base station may send signaling to the terminal to instruct to stop monitoring downlink control information, so that the terminal enters an opportunity for DRX period in advance. As shown in FIG. 6, the terminal receives, in the third slot in which the timer 1 is effective, signaling that is sent by the base station and that is used to instruct to stop monitoring downlink control information. The signaling may be sent to the terminal by using RRC signaling, or may be sent by the base station to the terminal by using an MAC CE, or may be sent by the base station to the terminal by using DCI.

The terminal enters the opportunity for DRX period in the following manners according to the signaling used to instruct to stop monitoring downlink control information:

Optionally, the terminal may enter the opportunity for DRX period immediately after successfully demodulating the signaling message. For example, after successfully demodulating the signaling message in the fourth slot in which the timer 1 shown in FIG. 6 is effective, the terminal no longer monitors a PDCCH. Optionally, after successfully demodulating the signaling message, the terminal may enter the opportunity for DRX period after the currently effective timer 1 expires. For example, the terminal enters the opportunity for DRX period in the effective period of the timer 2 shown in FIG. 6 or the effective period of the timer 3 after the timer 2 expires, and no longer monitors a PDCCH. Optionally, the terminal may alternatively enter, according to an indication of signaling content sent by the base station, the opportunity for DRX period after the timer 2 expires. For example, the terminal is in a sleep mode in the effective period of the timer 3 shown in FIG. 6 or the opportunity for DRX period after the timer 3 expires, and no longer monitors a PDCCH.

In existing LTE, the terminal needs to perform monitoring in each downlink subframe if the terminal is in the active mode. Compared with the existing DRX technology of LTE, in Example 1, if duration of a DRX on duration period is the same, this application can reduce a frequency of monitoring downlink control information by the terminal when the terminal is in the active mode. During an effective period of any timer, if the terminal does not need to monitor downlink control information in a current slot, the terminal may enter the short sleep mode in the current slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 1, the three timers are configured for the terminal configured with DRX, different manners are used for monitoring downlink control information in the effective periods of the different timers, and performance requirements of reducing power consumption and ensuring scheduling flexibility can be both met.

Figure 7:
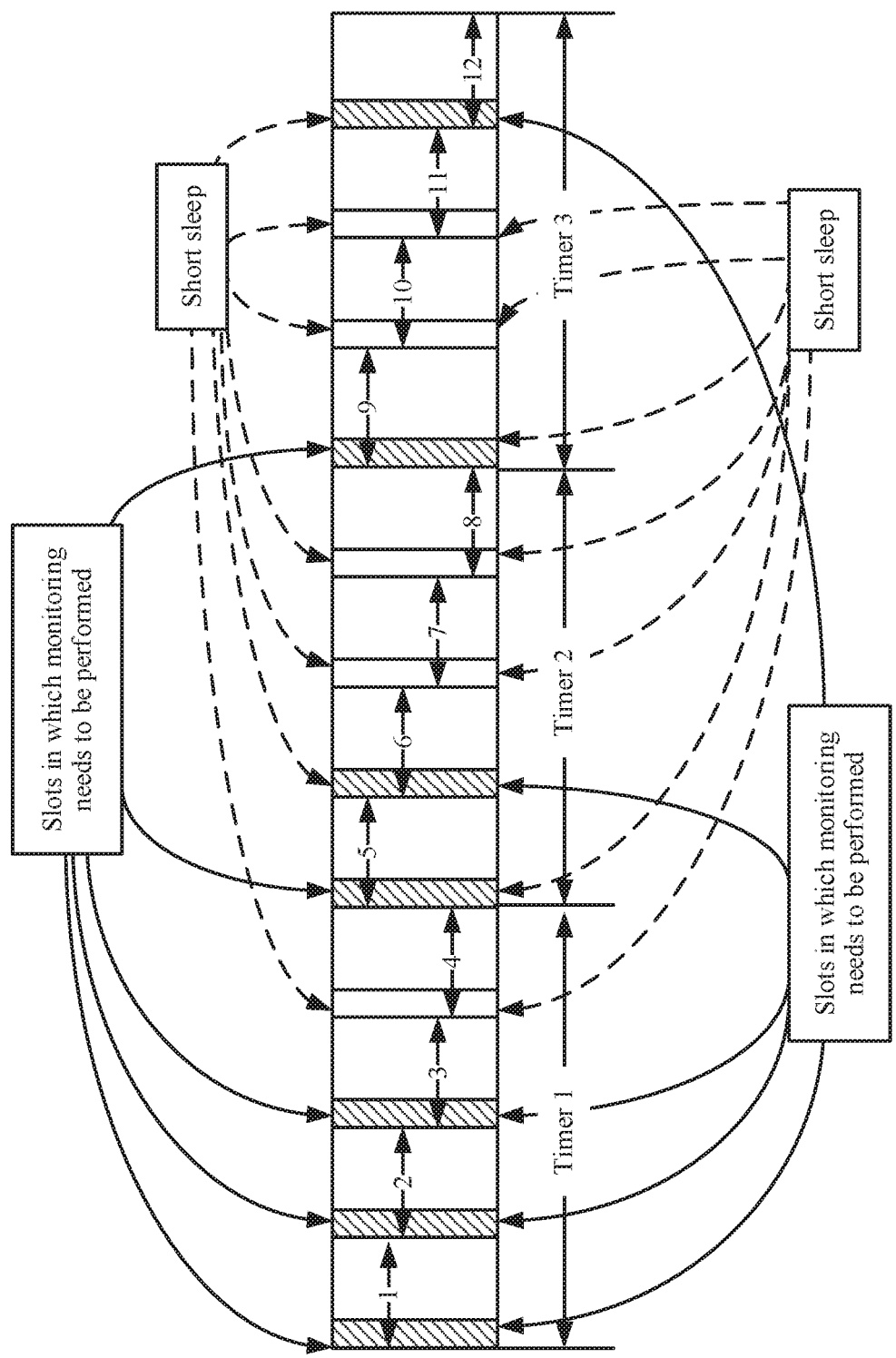
FIG. 7 is a schematic diagram of a downlink control information monitoring method according to Example 2 of this application.

Example 2 provided in this application is shown in FIG. 7. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The terminal is configured to perform slot-based transmission, and each of the three time resource unit ranges includes four consecutive slots. Monitoring is performed once in each slot in the $1^{st}$ time resource unit range, monitoring is performed once every two slots in the $2^{nd}$ time resource unit range, and monitoring is performed once every four slots in the $3^{rd}$ time resource unit range. The timer 1, the timer 2, and the timer 3 are alternately started. The timer 1 is first started, the timer 2 is started when the timer 1 expires, and the timer 3 is started when the timer 2 expires.

A difference from Example 1 is: Not all slots include a downlink control area. For example, the fourth slot in which the timer 1 is effective does not include a downlink control area, the seventh slot and the eighth slot in which the timer 2 is effective do not include a downlink control area, and the tenth slot and the eleventh slot in which the timer 3 is effective do not include a downlink control area. The terminal may turn off the RF link between the terminal and the base station in a slot that does not include a downlink control area, and enter the short sleep mode to save power.

According to the foregoing configuration, performing, by the terminal, the downlink control information monitoring method specifically includes the following:

After the terminal successfully performs initial transmission of uplink data or downlink data once, or detects, in any time resource unit range, downlink control information used to instruct the terminal to receive or send initially transmitted data, the timer 1 is started. In the four slots in which the timer 1 is effective, the terminal monitors a PDCCH once in each of the first three slots; and because the fourth slot does not include a downlink control area, the terminal enters the short sleep mode in the fourth slot to save power and reduce power consumption of the terminal. After the timer 1 expires, the timer 2 is started. The terminal monitors a PDCCH once every two slots. For example, in the four slots in which the timer 2 is effective, the terminal may perform monitoring in the fifth and the seventh slots, or may perform monitoring in the sixth and the eighth slots. After the timer 2 expires, the timer 3 is started. In the four slots in which the timer 3 is effective, the terminal monitors a PDCCH once every four slots. Similarly, the terminal may perform monitoring in the ninth slot in which the timer 3 is effective, or may perform monitoring in the twelfth slot. Because the seventh slot and the eighth slot in which the timer 2 is effective do not include a downlink control area, and the tenth slot and the eleventh slot in which the timer 3 is effective do not include a downlink control area, when the terminal performs monitoring in the fifth slot in which the timer 2 is effective, and the terminal performs monitoring in the ninth slot in which the timer 3 is effective, the terminal turns off the RF link in the sixth slot, the seventh slot, the eighth slot, the tenth slot, the eleventh slot, and the twelfth slot, and enters the short sleep mode to save power. Alternatively, when the terminal performs monitoring in the sixth slot in which the timer 2 is effective, and the terminal performs monitoring in the twelfth slot in which the timer 3 is effective, the terminal turns off the RF link in the fifth slot, the seventh slot, the eighth slot, the ninth slot, the tenth slot, and the eleventh slot, and enters the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 2, if duration of a DRX on duration period is the same, this application can reduce a frequency of monitoring downlink control information by the terminal when the terminal is in the active mode. During an effective period of any timer, if the terminal does not need to monitor downlink control information in a current slot, the terminal may enter the short sleep mode in the current slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 2, the three timers are configured for the terminal configured with DRX, different manners are used for monitoring downlink control information in the effective periods of the different timers, and performance requirements of reducing power consumption and ensuring scheduling flexibility can be both met.

Figure 8:
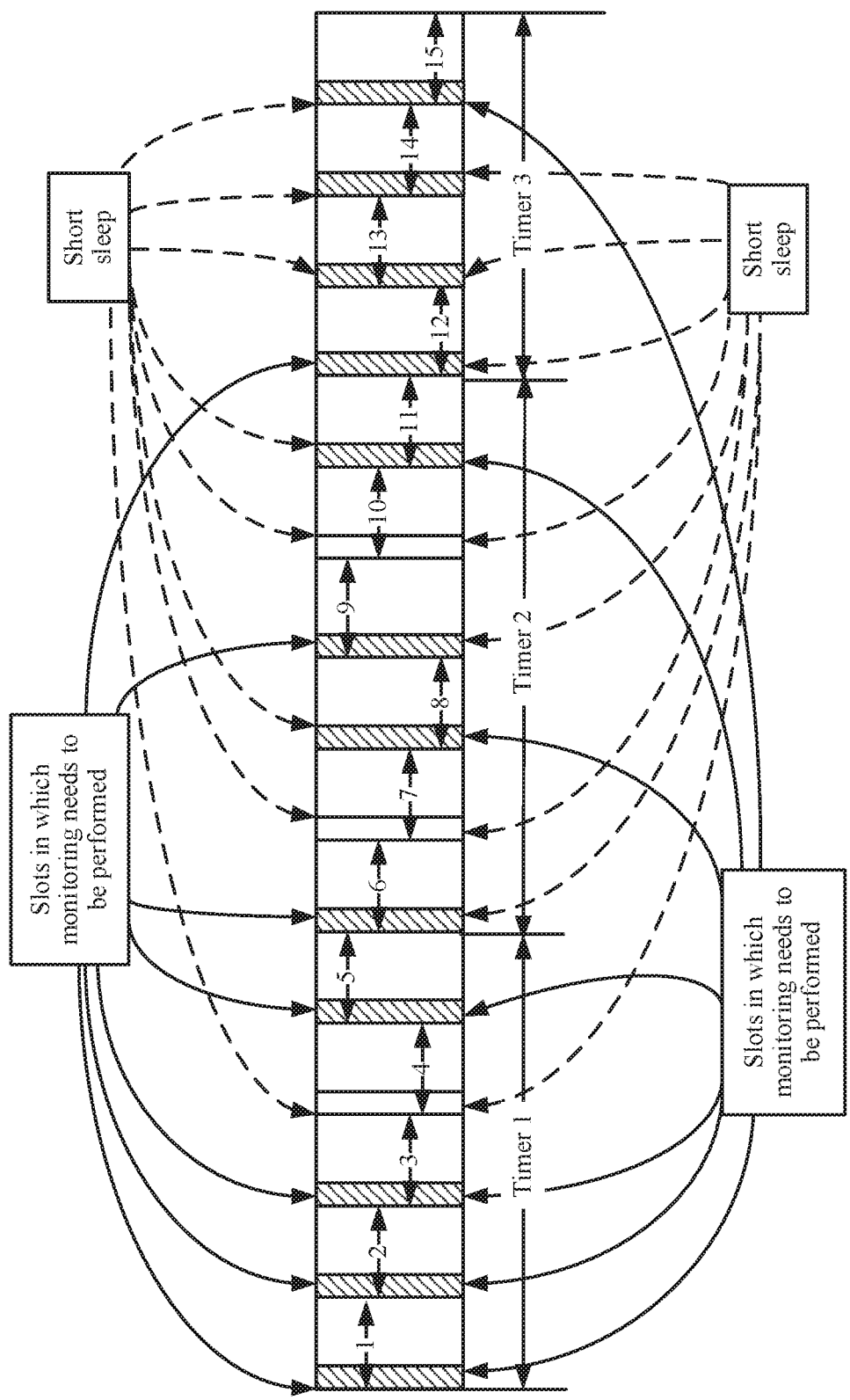
FIG. 8 is a schematic diagram of a downlink control information monitoring method according to Example 3 of this application.

Example 3 provided in this application is shown in FIG. 8. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The terminal is configured to perform slot-based transmission. Monitoring is performed once in each slot in the $1^{st}$ time resource unit range, monitoring is performed once every two slots in the $2^{nd}$ time resource unit range, and monitoring is performed once every four slots in the $2^{nd}$ time resource unit range. The timer 1, the timer 2, and the timer 3 are alternately started. The timer 1 is first started, the timer 2 is started when the timer 1 expires, and the timer 3 is started when the timer 2 expires.

A difference from Example 1 is: Not all slots include a downlink control area, the time resource unit ranges include different slots, and each time resource unit range includes four slots that include downlink control areas. Specifically, as shown in FIG. 8, the $1^{st}$ time resource unit range includes five slots, and the fourth slot does not include a downlink control area. The $2^{nd}$ time resource unit range includes six slots, the seventh slot and the tenth slot do not include a downlink control area, and the other four slots include downlink control areas. The $3^{rd}$ time resource unit range includes four slots including downlink control areas. The terminal may turn off the RF link between the terminal and the base station in a slot that does not include a downlink control area, and enter the short sleep mode to save power. Because different configuration manners are used for the time resource unit ranges, duration of each timer also varies. Duration in which the timer 1 is effective includes five slots, duration in which the timer 2 is effective includes six slots, and duration in which the timer 3 is effective includes four slots.

It should be noted that, each time resource unit range includes four slots including downlink control areas, and duration of each time resource unit range is a relative value. Therefore, in this example, the timer may be replaced with a counter, that is, each time resource unit range is corresponding to one counter.

According to the foregoing configuration, performing, by the terminal, the downlink control information monitoring method specifically includes the following:

After the terminal successfully performs initial transmission of uplink data or downlink data once, or detects, in any time resource unit range, downlink control information used to instruct the terminal to receive or send initially transmitted data, the timer 1 is started; in the five slots in which the timer 1 is effective, the terminal monitors a PDCCH once in each of the first three slots and the fifth slot; and because the fourth slot does not include a downlink control area, the terminal enters the short sleep mode in the fourth slot in which the timer 1 is effective, to save power and reduce power consumption of the terminal. After the timer 1 expires, the timer 2 is started. In the six slots in which the timer 2 is effective, the terminal monitors a PDCCH once every two slots. For example, in the six slots in which the timer 2 is effective, the terminal may perform monitoring in the sixth and the ninth slots, or may perform monitoring in the eighth and the eleventh slots. After the timer 2 expires, the timer 3 is started. In the four slots in which the timer 3 is effective, the terminal monitors a PDCCH once every four slots. Similarly, the terminal may perform monitoring in the twelfth slot in which the timer 3 is effective, or may perform monitoring in the fifteenth slot. Because the seventh slot and the tenth slot in which the timer 2 is effective do not include a downlink control area, when the terminal performs monitoring in the sixth slot and the ninth slot in which the timer 2 is effective, and performs monitoring in the twelfth slot in which the timer 3 is effective, the terminal may turn off the RF link in the seventh slot, the eighth slot, the tenth slot, the eleventh slot, the thirteenth slot, the fourteenth slot, and the fifteenth slot, and enter the short sleep mode to save power. Alternatively, when the terminal performs monitoring in the eighth and the eleventh slots in which the timer 2 is effective, and performs monitoring in the fifteenth slot in which the timer 3 is effective, the terminal turns off the RF link in the sixth slot, the seventh slot, the ninth slot, the tenth slot, the twelfth slot, the thirteenth slot, and the fourteenth slot, and enters the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 3, if duration of a DRX on duration period is the same, this application can reduce a frequency of monitoring downlink control information by the terminal when the terminal is in the active mode. During an effective period of any timer, if the terminal does not need to monitor downlink control information in a current slot, the terminal may enter the short sleep mode in the current slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 3, the three timers are configured for the terminal configured with DRX, different manners are used for monitoring downlink control information in the effective periods of the different timers, and performance requirements of reducing power consumption and ensuring scheduling flexibility can be both met.

Figure 9:
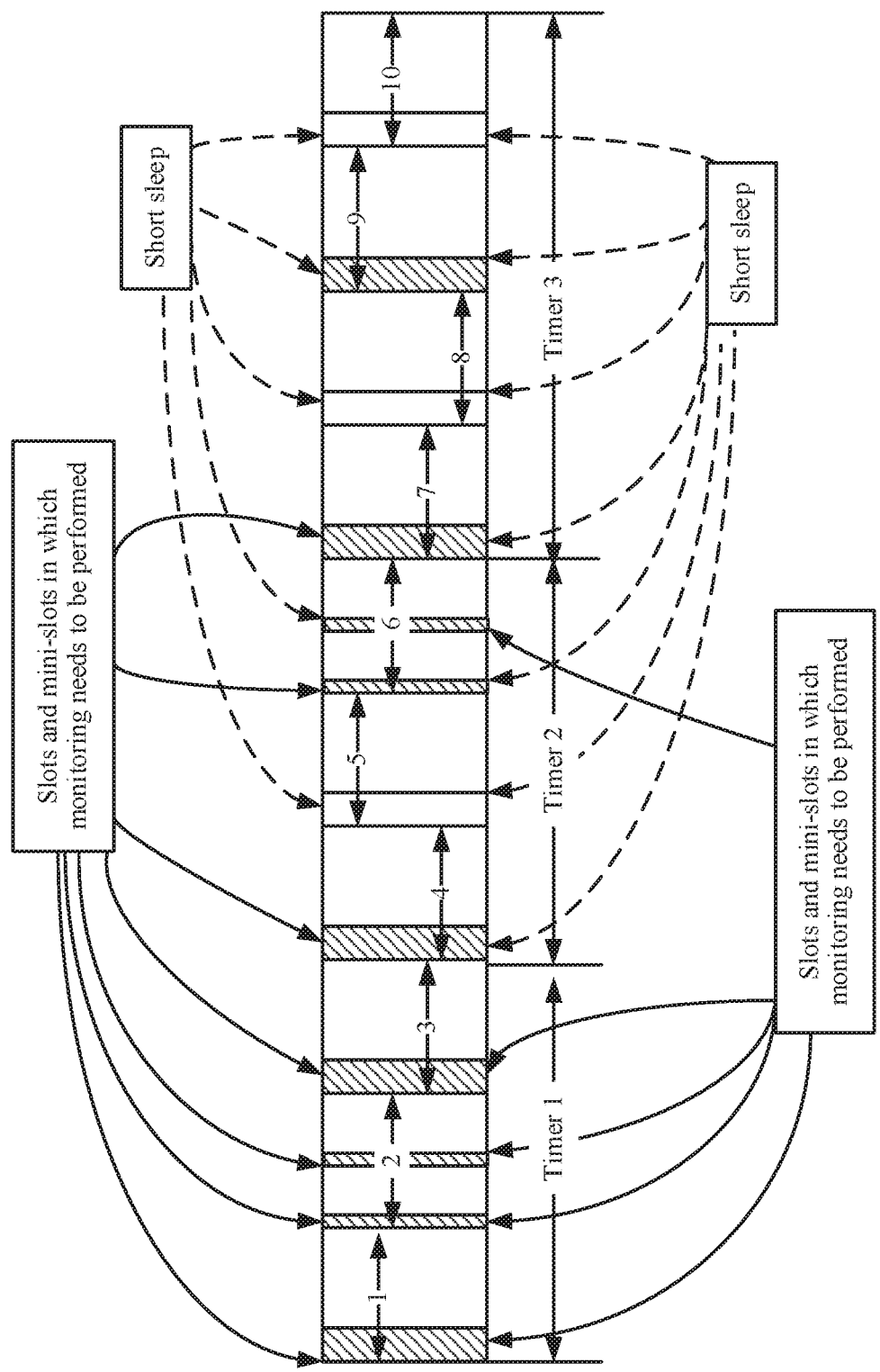
FIG. 9 is a schematic diagram of a downlink control information monitoring method according to Example 4 of this application.

Example 4 provided in this application is shown in FIG. 9. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The terminal is configured to perform slot-based transmission and mini-slot-based transmission. Monitoring is performed once in each time resource unit in the $1^{st}$ time resource unit range, monitoring is performed once every two time resource units in the $2^{nd}$ time resource unit range, and monitoring is performed once every four time resource units in the $3^{rd}$ time resource unit range. A quantity of time resource units in each time resource unit range is a sum of quantities of slots and mini-slots in the time resource unit range. The timer 1, the timer 2, and the timer 3 are alternately started. The timer 1 is first started, the timer 2 is started when the timer 1 expires, and the timer 3 is started when the timer 2 expires.

A difference from Example 1 is: The time resource unit ranges include different slots. A sum of quantities of slots and mini-slots included in each time resource unit range is 4, and not all slots include a downlink control area. Specifically, as shown in FIG. 9, the $1^{st}$ time resource unit range includes three slots, and two mini-slot-based transmissions are configured in the second slot in the $1^{st}$ time resource unit range. The $2^{nd}$ time resource unit range includes three slots, two mini-slot-based transmissions are configured in the sixth slot, and the fifth slot does not include a downlink control area. The $3^{rd}$ time resource unit range includes four slots, and the eighth slot and the tenth slot do not include a downlink control area. Because different configuration manners are used for the time resource unit ranges, duration of each timer also varies. Duration in which the timer 1 is effective includes three slots, duration in which the timer 2 is effective includes three slots, and duration in which the timer 3 is effective includes four slots. The terminal may turn off the RF link between the terminal and the base station in a slot that does not include a downlink control area, and enter the short sleep mode to save power.

It should be noted that, each time resource unit range includes four slots or four (slots plus mini-slots), and duration of each time resource unit range is a relative value. Therefore, in this example, the timer may be replaced with a counter. In other words, each time resource unit range is corresponding to one counter.

According to the foregoing configuration, performing, by the terminal, the downlink control information monitoring method specifically includes the following:

After the terminal successfully performs initial transmission of uplink data or downlink data once, or detects, in any time resource unit range, downlink control information used to instruct the terminal to receive or send initially transmitted data, the timer 1 is started, and in the three slots in which the timer 1 is effective, the terminal monitors a PDCCH once in the first slot, monitors a PDCCH once in each of the two mini-slots configured in the second slot, and monitors a PDCCH once in the third slot. After the timer 1 expires, the timer 2 is started. In the three slots in which the timer 2 is effective, the terminal monitors a PDCCH once every two slots. In the three slots in which the timer 2 is effective, the terminal may perform monitoring in the fourth slot and the first mini-slot configured in the sixth slot in which the timer 2 is effective, or may perform monitoring in the second mini-slot configured in the sixth slot in which the timer 2 is effective. After the timer 2 expires, the timer 3 is started. In the four slots in which the timer 3 is effective, the terminal monitors a PDCCH once every four slots. Because the eighth slot and the tenth slot in the $3^{rd}$ time resource unit range do not include a downlink control area, the terminal may perform monitoring in the seventh slot in which the timer 3 is effective. Optionally, because the fifth slot in which the timer 2 is effective does not include a downlink control area, when the terminal performs monitoring in the fourth slot and the first mini-slot configured in the sixth slot in the three slots in which the timer 2 is effective, and performs monitoring in the seventh slot in which the timer 3 is effective, the terminal turns off the RF link in the fifth slot, the second mini-slot configured in the sixth slot, the eighth slot, the ninth slot, and the tenth slot, and enters the short sleep mode to save power. Alternatively, when the terminal performs monitoring in the second mini-slot configured in the sixth slot in the three slots in which the timer 2 is effective, the terminal turns off the RF link in the fourth slot, the fifth slot, the first mini-slot configured in the sixth slot, the seventh slot, the eighth slot, the ninth slot, and the tenth slot, and enters the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 4, if duration of a DRX on duration period is the same, this application can reduce a frequency of monitoring downlink control information by the terminal when the terminal is in the active mode. During an effective period of any timer, if the terminal does not need to monitor downlink control information in a current slot or mini-slot, the terminal may enter the short sleep mode in the current slot or mini-slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 4, the three timers are configured for the terminal configured with DRX, different manners are used for monitoring downlink control information in the effective periods of the different timers, and performance requirements of reducing power consumption and ensuring scheduling flexibility can be both met.

Figure 10:
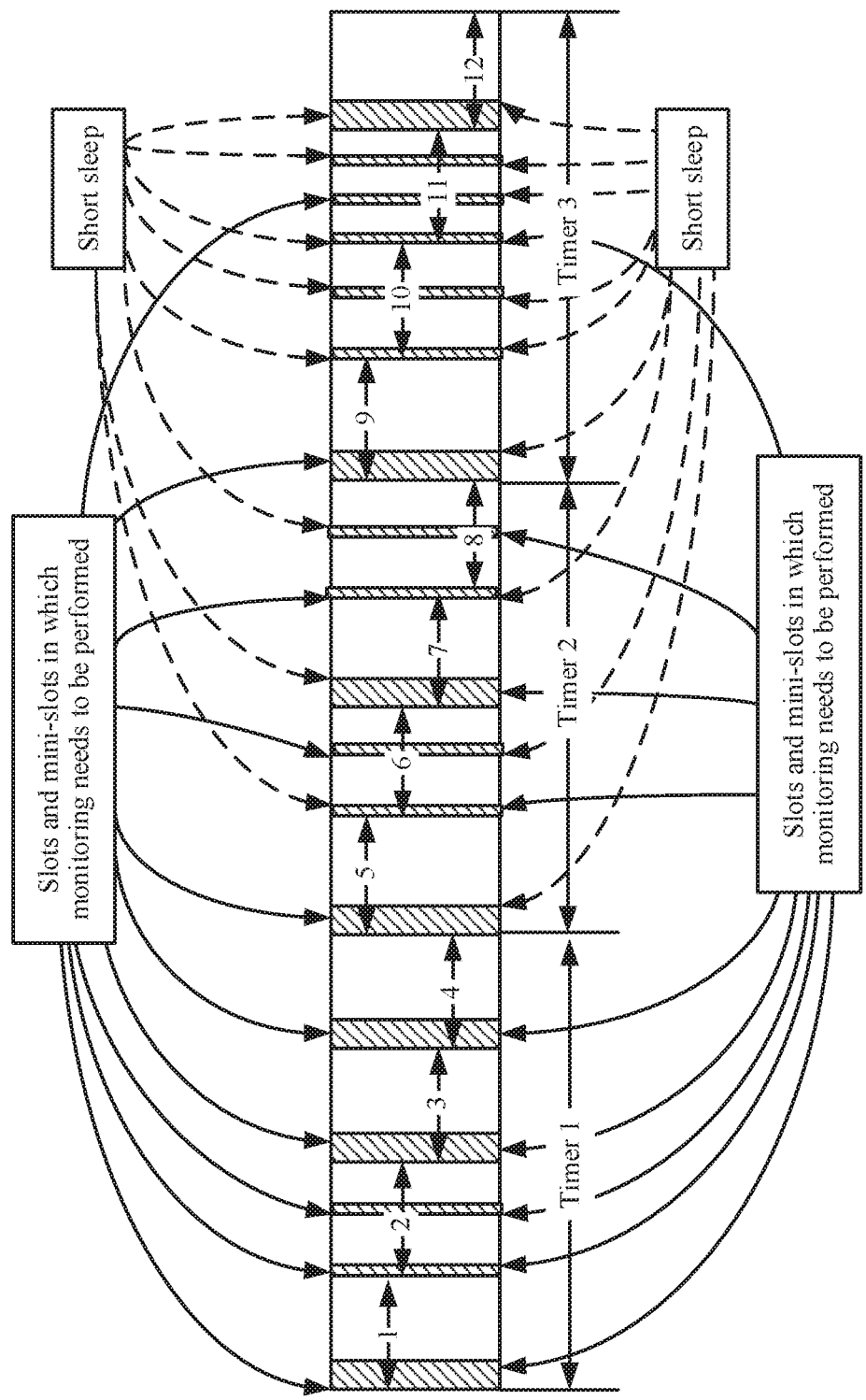
FIG. 10 is a schematic diagram of a downlink control information monitoring method according to Example 5 of this application.

Example 5 provided in this application is shown in FIG. 10. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The terminal is configured to perform slot-based transmission and mini-slot-based transmission. Monitoring is performed once in each time resource unit in the $1^{st}$ time resource unit range, monitoring is performed once every two time resource units in the $2^{nd}$ time resource unit range, and monitoring is performed once every four time resource units in the $3^{rd}$ time resource unit range. A quantity of time resource units in each time resource unit range is a sum of quantities of slots and mini-slots in the time resource unit range. The timer 1, the timer 2, and the timer 3 are alternately started. The timer 1 is first started, the timer 2 is started when the timer 1 expires, and the timer 3 is started when the timer 2 expires.

A difference from Example 1 is: Not only slot-based transmission is configured in each time resource unit range, but also mini-slot-based transmission is configured in each time resource unit range. Specifically, as shown in FIG. 10, the $1^{st}$ time resource unit range includes four slots, and two mini-slot-based transmissions are configured in the second slot in the $1^{st}$ time resource unit range. The $2^{nd}$ time resource unit range includes four slots, and two mini-slot-based transmissions are configured in the sixth slot and the eighth slot each. The $3^{rd}$ time resource unit range includes four slots, two mini-slot-based transmissions are configured in the tenth slot in the $3^{rd}$ time resource unit range, and three mini-slot-based transmissions are configured in the eleventh slot.

According to the foregoing configuration, performing, by the terminal, the downlink control information monitoring method specifically includes the following:

After the terminal successfully performs initial transmission of uplink data or downlink data once, or detects, in any time resource unit range, downlink control information used to instruct the terminal to receive or send initially transmitted data, the timer 1 is started, and in the four slots in which the timer 1 is effective, the terminal monitors a PDCCH once in the first slot, monitors a PDCCH once in each of the two mini-slots configured in the second slot, and monitors a PDCCH once in the third slot. After the timer 1 expires, the timer 2 is started. The terminal monitors a PDCCH once every two slots or mini-slots in the four slots in which the timer 2 is effective. For example, the terminal may perform monitoring in the fifth slot, the second mini-slot in the sixth slot, and the first mini-slot in the eighth slot in the four slots in which the timer 2 is effective, or may perform monitoring in the first mini-slot in the sixth slot, the seventh slot, and the second mini-slot in the eighth slot in the four slots in which the timer 2 is effective. After the timer 2 expires, the timer 3 is started. The terminal monitors a PDCCH once every four slots or mini-slots in the four slots in which the timer 3 is effective. The terminal may perform monitoring in the ninth slot and the second mini-slot in the eleventh slot in the four slots in which the timer 3 is effective, or may perform monitoring in the first mini-slot in the eleventh slot in the four slots in which the timer 3 is effective. The terminal turns off the RF link in slots or mini-slots in which monitoring is not performed in the four slots in which the timer 2 is effective and the four slots in which the timer 3 is effective, and enters the short sleep mode to save power. For example, when the terminal performs monitoring in the fifth slot, the second mini-slot in the sixth slot, and the first mini-slot in the eighth slot in the four slots in which the timer 2 is effective, and performs monitoring in the ninth slot and the second mini-slot in the eleventh slot in the four slots in which the timer 3 is effective, the terminal turns off the RF link in the first mini-slot configured in the sixth slot, the seventh slot, the second mini-slot configured in the eighth slot, the tenth slot, the first mini-slot configured in the eleventh slot, the third mini-slot configured in the eleventh slot, and the twelfth slot, and enters the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 5, if duration of a DRX on duration period is the same, this application can reduce a frequency of monitoring downlink control information by the terminal when the terminal is in the active mode. During an effective period of any timer, if the terminal does not need to monitor downlink control information in a current slot or mini-slot, the terminal may enter the short sleep mode in the current slot or mini-slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 4, the three timers are configured for the terminal configured with DRX, different manners are used for monitoring downlink control information in the effective periods of the different timers, and performance requirements of reducing power consumption and ensuring scheduling flexibility can be both met.

Figure 11:
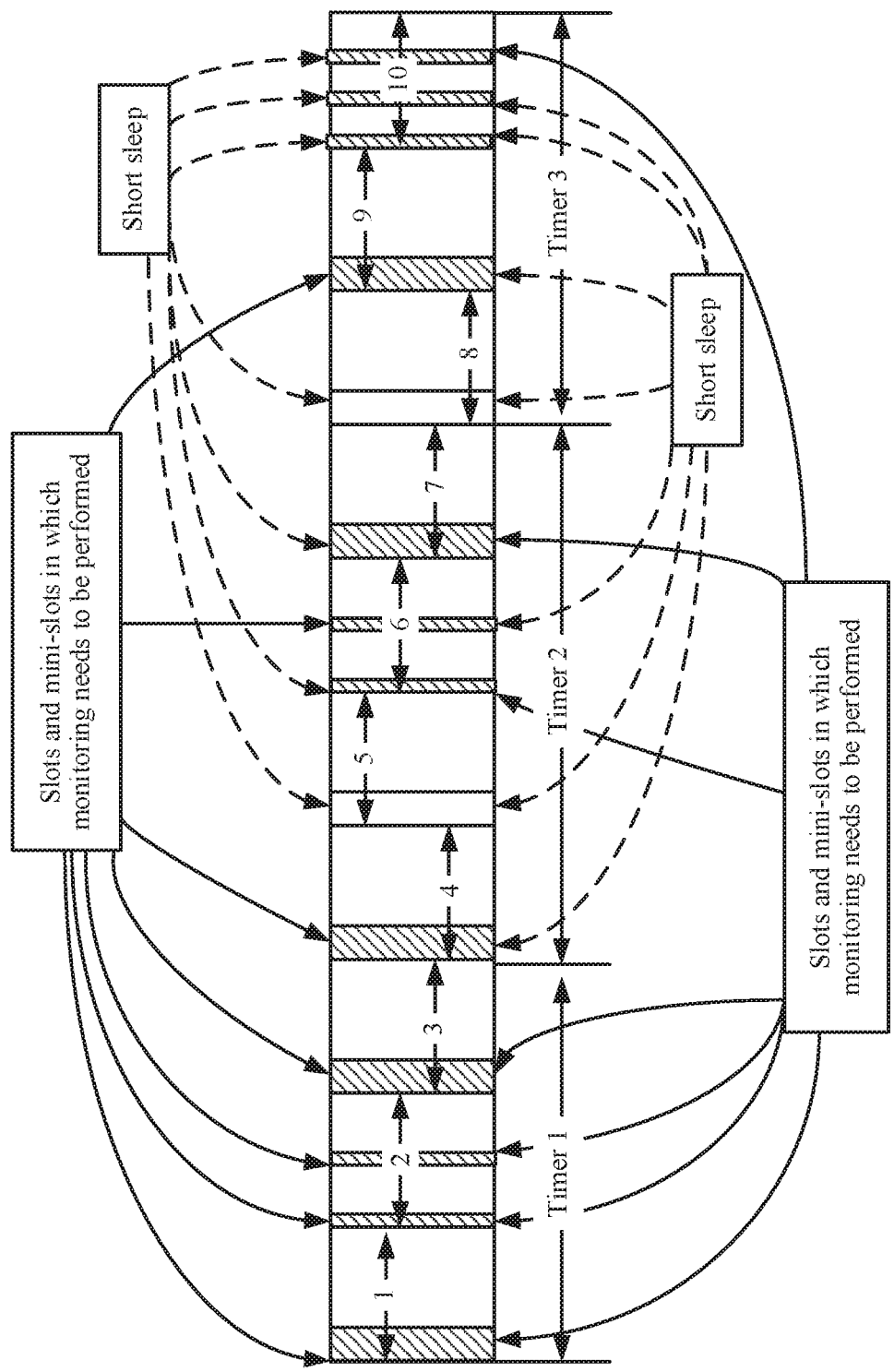
FIG. 11 is a schematic diagram of a downlink control information monitoring method according to Example 6 of this application.

Example 6 provided in this application is shown in FIG. 11. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The terminal is configured to perform slot-based transmission and mini-slot-based transmission. Monitoring is performed once in each time resource unit including a downlink control area in the $1^{st}$ time resource unit range, monitoring is performed once every two time resource units including downlink control areas in the $2^{nd}$ time resource unit range, and monitoring is performed once every four time resource units including downlink control areas in the $3^{rd}$ time resource unit range. A quantity of time resource units including downlink control areas in each time resource unit range is a sum of quantities of slots and mini-slots including downlink control areas in the time resource unit range. The timer 1, the timer 2, and the timer 3 are alternately started. The timer 1 is first started, the timer 2 is started when the timer 1 expires, and the timer 3 is started when the timer 2 expires.

A difference from Example 1 is: The time resource unit ranges include different slots. A sum of a quantity of slots including downlink control areas and a quantity of mini-slots including downlink control areas in each time resource unit range is 4, and not all slots include a downlink control area. Specifically, as shown in FIG. 11, the $1^{st}$ time resource unit range includes three slots, and two mini-slot-based transmissions are configured in the second slot in the $1^{st}$ time resource unit range. The $2^{nd}$ time resource unit range includes four slots, two mini-slot-based transmissions are configured in the sixth slot, and the fifth slot does not include a downlink control area. The $3^{rd}$ time resource unit range includes three slots, the eighth slot does not include a downlink control area, and three mini-slot-based transmissions are configured in the tenth slot. Because different configuration manners are used for the time resource unit ranges, duration of each timer also varies. Duration in which the timer 1 is effective includes three slots, duration in which the timer 2 is effective includes four slots, and duration in which the timer 3 is effective includes three slots. The terminal may turn off the RF link between the terminal and the base station in a slot that does not include a downlink control area, and enter the short sleep mode, so as to save power.

It should be noted that, each time resource unit range includes four slots including downlink control areas, or a total quantity of slots including downlink control areas and mini-slots including downlink control areas is four, and duration of each time resource unit range is a relative value. Therefore, in this example, the timer may be replaced with a counter. In other words, each time resource unit range is corresponding to one counter.

According to the foregoing configuration, performing, by the terminal, the downlink control information monitoring method specifically includes the following:

After the terminal successfully performs initial transmission of uplink data or downlink data once, or detects, in any time resource unit range, downlink control information used to instruct the terminal to receive or send initially transmitted data, the timer 1 is started, and in the three slots in which the timer 1 is effective, the terminal monitors a PDCCH once in the first slot, monitors a PDCCH once in each of the two mini-slots configured in the second slot, and monitors a PDCCH once in the third slot. After the timer 1 expires, the timer 2 is started. In the three slots in which the timer 2 is effective, because the fifth slot in which the timer 2 is effective does not include a downlink control area, the terminal may turn off the RF link in the second slot, and enter the short sleep mode to save power. The terminal monitors a PDCCH once every two slots or mini-slots including downlink control areas, and may perform monitoring in the fourth slot and the second mini-slot configured in the sixth slot in the four slots in which the timer 2 is effective, or may perform monitoring in the first mini-slot configured in the sixth slot in the four slots in which the timer 2 is effective. After the timer 2 expires, the timer 3 is started. In the three slots in which the timer 3 is effective, the terminal monitors a PDCCH once every four slots or mini-slots including downlink control areas. Because the eighth slot in the $3^{rd}$ time resource unit range does not include a downlink control area, the terminal may perform monitoring in the ninth slot in the three slots in which the timer 3 is effective, or may perform monitoring in the third mini-slot configured in the tenth slot in the three slots in which the timer 3 is effective. The terminal turns off the RF link in slots or mini-slots in which monitoring is not performed in the four slots in which the timer 2 is effective and the four slots in which the timer 3 is effective, and enters the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 6, if duration of a DRX on duration period is the same, this application can reduce a frequency of monitoring downlink control information by the terminal when the terminal is in the active mode. During an effective period of any timer, if the terminal does not need to monitor downlink control information in a current slot or mini-slot, the terminal may enter the short sleep mode in the current slot or mini-slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 4, the three timers are configured for the terminal configured with DRX, different manners are used for monitoring downlink control information in the effective periods of the different timers, and performance requirements of reducing power consumption and ensuring scheduling flexibility can be both met.

Figure 12:
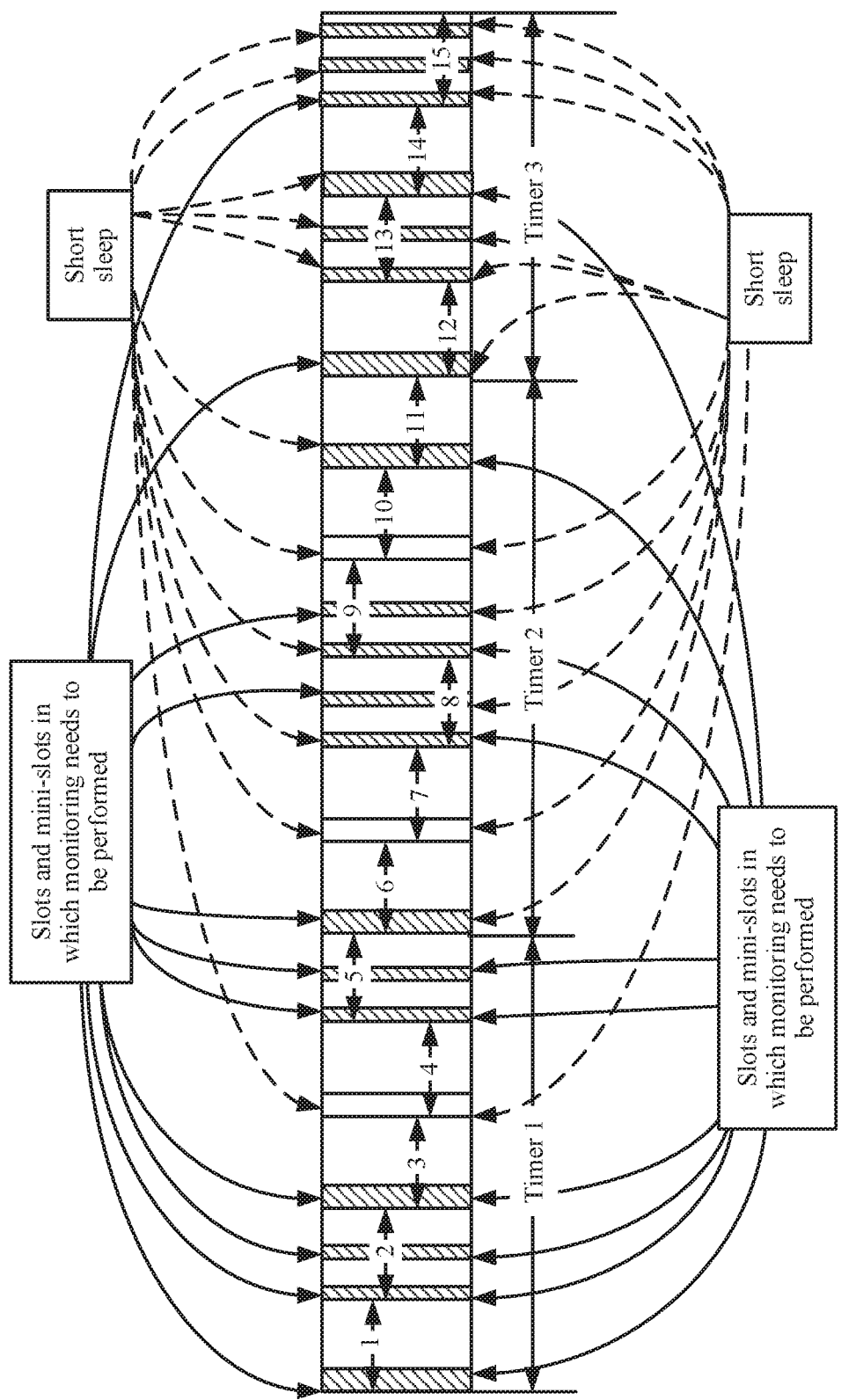
FIG. 12 is a schematic diagram of a downlink control information monitoring method according to Example 7 of this application.

Example 7 provided in this application is shown in FIG. 12. Three time resource unit ranges are configured for the terminal to monitor downlink control information in an on duration period of a DRX cycle, the 1 time resource unit range is implemented by a timer 1, the $2^{nd}$ time resource unit range is implemented by a timer 2, and the $3^{rd}$ time resource unit range is implemented by a timer 3. The terminal is configured to perform slot-based transmission and mini-slot-based transmission. Monitoring is performed once in each time resource unit including a downlink control area in the $1^{st}$ time resource unit range, monitoring is performed once every two time resource units including downlink control areas in the $2^{nd}$ time resource unit range, and monitoring is performed once every four time resource units including downlink control areas in the $3^{rd}$ time resource unit range. A quantity of time resource units including downlink control areas in each time resource unit range is a sum of quantities of slots and mini-slots including downlink control areas in the time resource unit range. The timer 1, the timer 2, and the timer 3 are alternately started. The timer 1 is first started, the timer 2 is started when the timer 1 expires, and the timer 3 is started when the timer 2 expires.

A difference from Example 1 is: The time resource unit ranges include different slots. Each time resource unit range includes four slots including downlink control areas, and not all slots include a downlink control area. Specifically, as shown in FIG. 12, the $1^{st}$ time resource unit range includes five slots, two mini-slot-based transmissions are configured in the second slot and the fifth slot each in the $1^{st}$ time resource unit range, and the fourth slot does not include a downlink control area. The $2^{nd}$ time resource unit range includes six slots, two mini-slot-based transmissions are configured in the eighth slot and the ninth slot each, and the seventh slot and the tenth slot do not include a downlink control area. The $3^{rd}$ time resource unit range includes four slots, and two mini-slot-based transmissions and three mini-slot-based transmissions are configured in the thirteenth slot and the fifteenth slot respectively. Because different configuration manners are used for the time resource unit ranges, duration of each timer also varies. Duration in which the timer 1 is effective includes five slots, duration in which the timer 2 is effective includes six slots, and duration in which the timer 3 is effective includes four slots. The terminal may turn off the RF link between the terminal and the base station in a slot that does not include a downlink control area, and enter the short sleep mode, so as to save power.

It should be noted that, each time resource unit range includes four slots including downlink control areas, and duration of each time resource unit range is a relative value. Therefore, in this example, the timer may be replaced with a counter. In other words, each time resource unit range is corresponding to one counter.

According to the foregoing configuration, performing, by the terminal, the downlink control information monitoring method specifically includes the following:

After the terminal successfully performs initial transmission of uplink data or downlink data once, or detects, in any time resource unit range, downlink control information used to instruct the terminal to receive or send initially transmitted data, the timer 1 is started, in the five slots in which the timer 1 is effective, the terminal monitors a PDCCH once in the first slot, monitors a PDCCH once in each of the two mini-slots in the second slot, monitors a PDCCH once in the third slot, and monitors a PDCCH once in the fifth slot; and because the fourth slot in which the timer 1 is effective does not include a downlink control area, the terminal may turn off the RF link in the fourth slot and enter the short sleep mode to save power. After the timer 1 expires, the timer 2 is started. In the six slots in which the timer 2 is effective, because the seventh slot and the tenth slot in which the timer 2 is effective do not include a downlink control area, the terminal may turn off the RF link in the seventh slot and the tenth slot, and enter the short sleep mode to save power. The terminal monitors a PDCCH once every two slots or mini-slots including downlink control areas, and may perform monitoring in the sixth slot, the second mini-slot configured in the eighth slot, and the second mini-slot configured in the ninth slot in the six slots in which the timer 2 is effective, or may perform monitoring in the first mini-slot configured in the eighth slot, the first mini-slot configured in the ninth slot, and the eleventh slot in the six slots in which the timer 2 is effective. After the timer 2 expires, the timer 3 is started. The terminal monitors a PDCCH once every four slots or mini-slots including downlink control areas in the four slots in which the timer 3 is effective. The terminal may perform monitoring in the twelfth slot and the first mini-slot configured in the fifteenth slot in the four slots in which the timer 3 is effective, or may perform monitoring in the fourteenth slot in the four slots in which the timer 3 is effective. The terminal turns off the RF link in slots or mini-slots in which monitoring is not performed in the six slots in which the timer 2 is effective and the four slots in which the timer 3 is effective, and enters the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 7, if duration of a DRX on duration period is the same, this application can reduce a frequency of monitoring downlink control information by the terminal when the terminal is in the active mode. During an effective period of any timer, if the terminal does not need to monitor downlink control information in a current slot or mini-slot, the terminal may enter the short sleep mode in the current slot or mini-slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 4, the three timers are configured for the terminal configured with DRX, different manners are used for monitoring downlink control information in the effective periods of the different timers, and performance requirements of reducing power consumption and ensuring scheduling flexibility can be both met.

Figure 13:
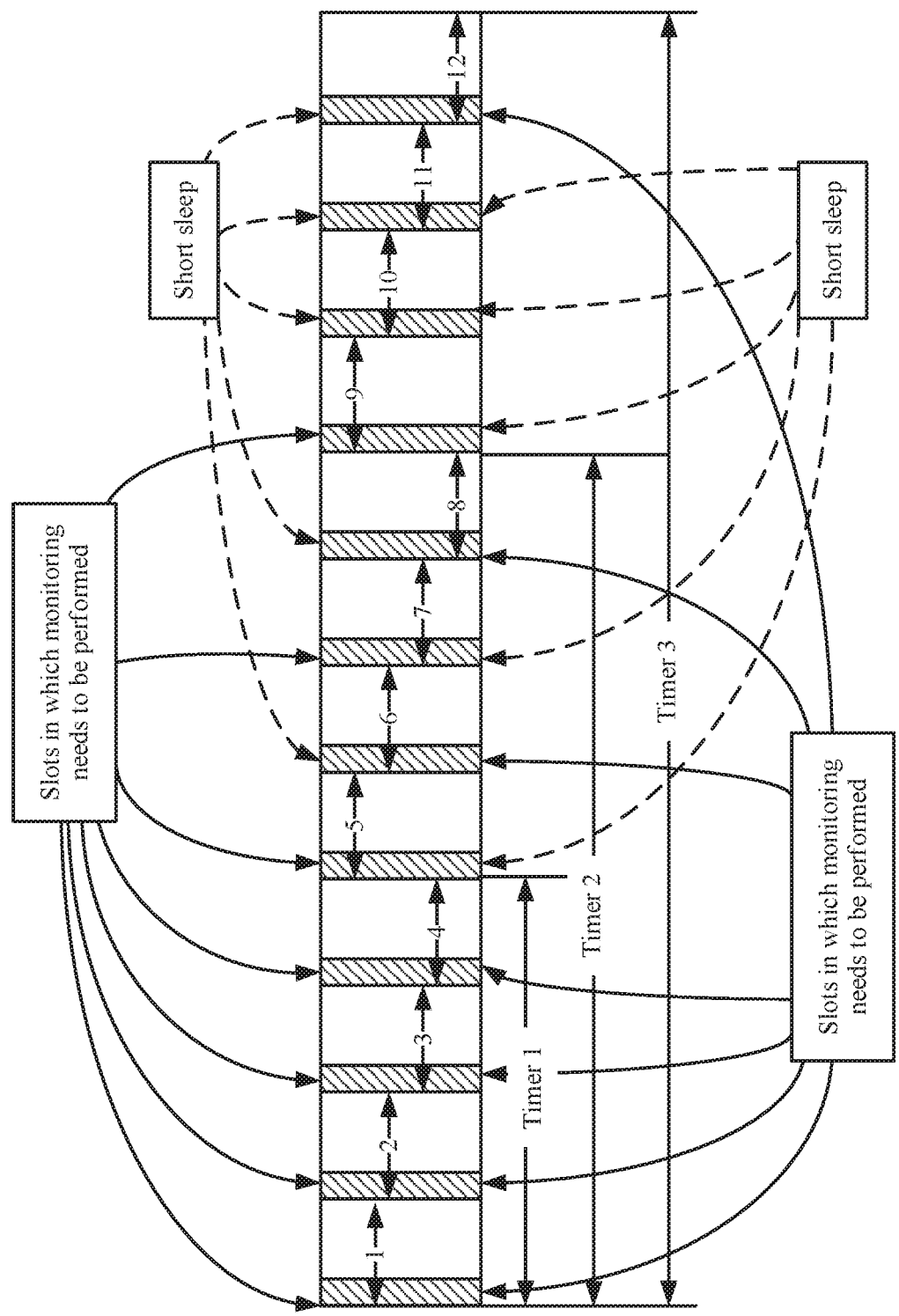
FIG. 13 is a schematic diagram of a downlink control information monitoring method according to Example 8 of this application.

Example 8 provided in this application is shown in FIG. 13. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The $1^{st}$ time resource unit range includes four consecutive slots, the $2^{nd}$ time resource unit range includes eight consecutive slots, and the $3^{rd}$ time resource unit range includes 12 consecutive slots. Start moments of the three time resource unit ranges are the same, each slot includes a downlink control area, and a symbol occupied by the downlink control area is used to carry downlink control information sent by the base station to the terminal. Monitoring is performed once in each slot in the $1^{st}$ time resource unit range, monitoring is performed once in each slot in an overlapping part of the $2^{nd}$ time resource unit range and the $1^{st}$ time resource unit range, and monitoring is performed once every two slots in a non-overlapping part of the $2^{nd}$ time resource unit range and the $1^{st}$ time resource unit range. A monitoring frequency in an overlapping part of the $3^{rd}$ time resource unit range and the $2^{nd}$ time resource unit range is the same as a monitoring frequency in the $2^{nd}$ time resource unit range. Monitoring is performed once every four slots in a non-overlapping part of the $3^{rd}$ time resource unit range and the $2^{nd}$ time resource unit range. The UE is configured to perform slot-based transmission. The timer 1, the timer 2, and the timer 3 are simultaneously started.

It should be noted that, each time resource unit range includes four slots including downlink control areas, and duration of each time resource unit range is a relative value. Therefore, in this example, the timer may be replaced with a counter. In other words, each time resource unit range is corresponding to one counter.

According to the foregoing configuration, performing, by the terminal, the downlink control information monitoring method specifically includes the following:

After the terminal successfully performs initial transmission of uplink data or downlink data once, or detects, in any time resource unit range, downlink control information used to instruct the terminal to receive or send initially transmitted data, the timer 1, the timer 2, and the timer 3 are simultaneously started. In the four slots in which the timer 1 is effective, the terminal monitors a PDCCH once in each slot. In the eight slots in which the timer 2 is effective, slots in which monitoring needs to be performed in the first four slots are the same as the slots in which monitoring needs to be performed in the four slots in which the timer 1 is effective, and the terminal monitors a PDCCH once every two slots in the last four slots. The terminal may perform monitoring in the fifth and the seventh slots in the eight slots in which the timer 2 is effective, or may perform monitoring in the sixth and the eighth slots. In the 12 slots in which the timer 3 is effective, slots in which monitoring needs to be performed in the first eight slots are the same as the slots in which monitoring needs to be performed in the eight slots in which the timer 2 is effective, and the terminal monitors a PDCCH once every four slots in the last four slots in which the timer 3 is effective.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 8, if duration of a DRX on duration period is the same, this application can reduce a frequency of monitoring downlink control information by the terminal when the terminal is in the active mode. During an effective period of any timer, if the terminal does not need to monitor downlink control information in a current slot, the terminal may enter the short sleep mode in the current slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 4, the three timers are configured for the terminal configured with DRX, different manners are used for monitoring downlink control information in the effective periods of the different timers, and performance requirements of reducing power consumption and ensuring scheduling flexibility can be both met.

Figure 14:
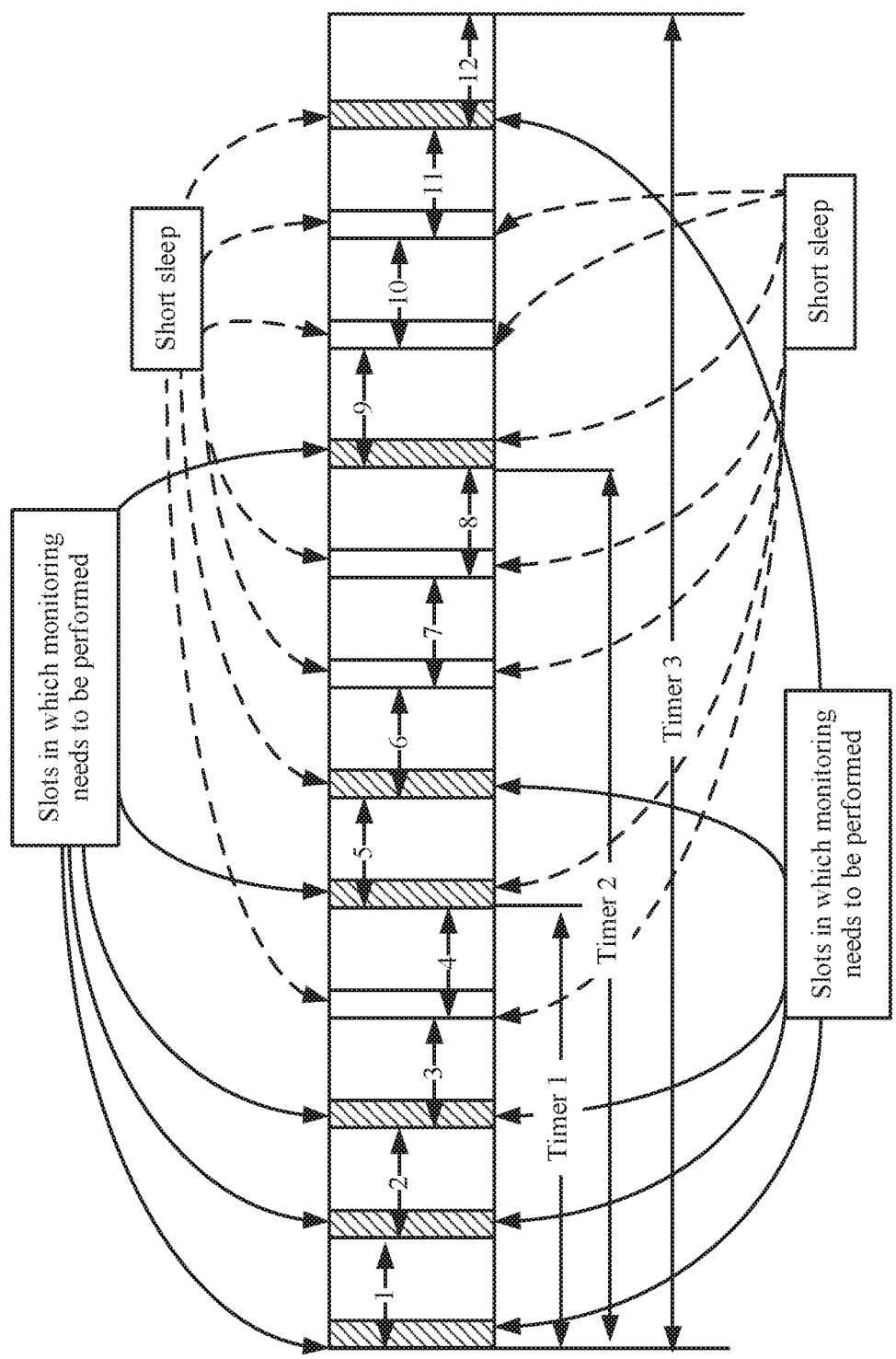
FIG. 14 is a schematic diagram of a downlink control information monitoring method according to Example 9 of this application.

Example 9 provided in this application is shown in FIG. 14. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The terminal is configured to perform slot-based transmission.

The $1^{st}$ time resource unit range includes four consecutive slots, the $2^{nd}$ time resource unit range includes eight consecutive slots, and the $3^{rd}$ time resource unit range includes 12 consecutive slots. Start moments of the three time resource unit ranges are the same. Monitoring is performed once in each slot in the $1^{st}$ time resource unit range, monitoring is performed once in each slot in an overlapping part of the $2^{nd}$ time resource unit range and the $1^{st}$ time resource unit range, and monitoring is performed once every two slots in a non-overlapping part of the $2^{nd}$ time resource unit range and the $1^{st}$ time resource unit range. A monitoring frequency in an overlapping part of the $3^{rd}$ time resource unit range and the $2^{nd}$ time resource unit range is the same as a monitoring frequency in the $2^{nd}$ time resource unit range. Monitoring is performed once every four slots in a non-overlapping part of the $3^{rd}$ time resource unit range and the $2^{nd}$ time resource unit range. The UE is configured to perform slot-based transmission. The timer 1, the timer 2, and the timer 3 are simultaneously started.

A difference from Example 8 is: Not all slots include a downlink control area. For example, the fourth slot in which the timer 1 is effective does not include a downlink control area, the fourth slot, the seventh slot, and the eighth slot in which the timer 2 is effective do not include a downlink control area, and the fourth slot, the seventh slot, the eighth slot, the tenth slot, and the eleventh slot in which the timer 3 is effective do not include a downlink control area.

It should be noted that, each time resource unit range includes four slots including downlink control areas, and duration of each time resource unit range is a relative value. Therefore, in this example, the timer may be replaced with a counter, that is, each time resource unit range is corresponding to one counter.

According to the foregoing configuration, performing, by the terminal, the downlink control information monitoring method specifically includes the following:

When the terminal detects, in any time resource unit range, downlink control information used to instruct the terminal to receive or send initially transmitted data, the timer 1, the timer 2, and the timer 3 are simultaneously started, in the four slots in which the timer 1 is effective, the terminal monitors a PDCCH once in each of the first three slots; and because the fourth slot does not include a downlink control area, the terminal enters the short sleep mode in the fourth slot to save power and reduce power consumption of the terminal. In the eight slots in which the timer 2 is effective, slots in which monitoring needs to be performed in the first four slots are the same as the slots in which monitoring needs to be performed in the four slots in which the timer 1 is effective, and the terminal monitors a PDCCH once every two slots in the last four slots. In the last four slots in which the timer 2 is effective, because the seventh slot and the eighth slot do not include a downlink control area, the terminal may perform monitoring in the fifth slot or the sixth slot in the last four slots in which the timer 2 is effective. The terminal turns off the RF link in slots in which monitoring is not performed in the last four slots in which the timer 2 is effective, and enters the short sleep mode to save power. In the 12 slots in which the timer 3 is effective, slots in which monitoring needs to be performed in the first eight slots are the same as the slots in which monitoring needs to be performed in the eight slots in which the timer 2 is effective, and the terminal monitors a PDCCH once every four slots in the last four slots in which the timer 3 is effective. Because the tenth slot and the eleventh slot do not include a downlink control area, the terminal may perform monitoring in the ninth slot or the twelfth slot in the last four slots in which the timer 3 is effective. The terminal turns off the RF link in slots in which monitoring is not performed in the last four slots in which the timer 3 is effective, and enters the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 9, if duration of a DRX on duration period is the same, this application can reduce a frequency of monitoring downlink control information by the terminal when the terminal is in the active mode. During an effective period of any timer, if the terminal does not need to monitor downlink control information in a current slot, the terminal may enter the short sleep mode in the current slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 9, the three timers are configured for the terminal configured with DRX, different manners are used for monitoring downlink control information in the effective periods of the different timers, and performance requirements of reducing power consumption and ensuring scheduling flexibility can be both met.

Figure 15:
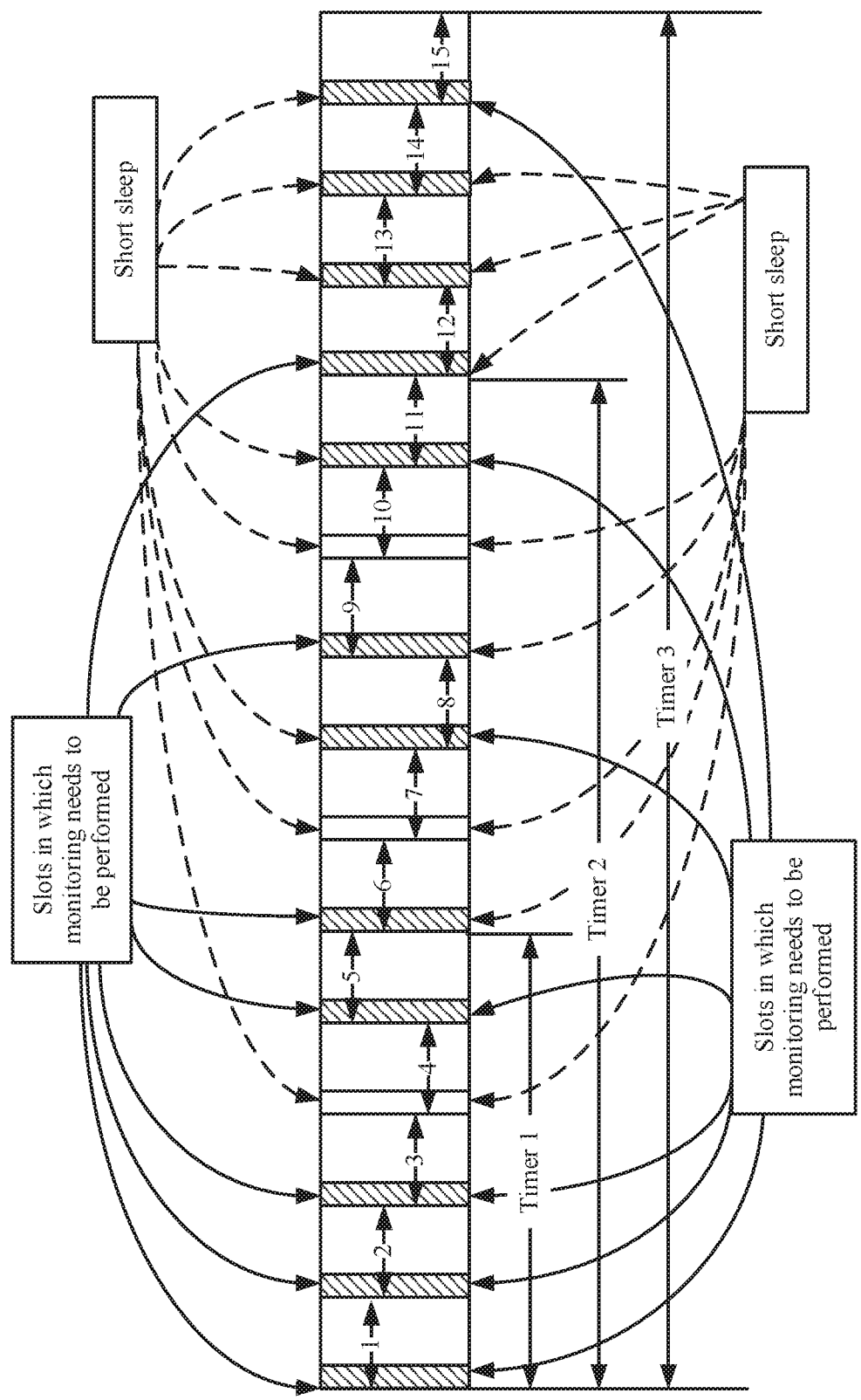
FIG. 15 is a schematic diagram of a downlink control information monitoring method according to Example 10 of this application.

Example 10 provided in this application is shown in FIG. 15. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The terminal is configured to perform slot-based transmission.

The $1^{st}$ time resource unit range includes four consecutive slots, the $2^{nd}$ time resource unit range includes eight consecutive slots, and the $3^{rd}$ time resource unit range includes 12 consecutive slots. Start moments of the three time resource unit ranges are the same. Monitoring is performed once in each slot in the $1^{st}$ time resource unit range, monitoring is performed once in each slot in an overlapping part of the 2nd time resource unit range and the $1^{st}$ time resource unit range, and monitoring is performed once every two slots in a non-overlapping part of the $2^{nd}$ time resource unit range and the $1^{st}$ time resource unit range. A monitoring frequency in an overlapping part of the $3^{rd}$ time resource unit range and the 2nd time resource unit range is the same as a monitoring frequency in the 2nd time resource unit range. Monitoring is performed once every four slots in a non-overlapping part of the $3^{rd}$ time resource unit range and the 2nd time resource unit range. The UE is configured to perform slot-based transmission. The timer 1, the timer 2, and the timer 3 are simultaneously started.

A difference from Example 8 is: Not all slots include a downlink control area, and the time resource unit ranges include different slots. Specifically, as shown in FIG. 15, the $1^{st}$ time resource unit range includes five slots, the fourth slot does not include a downlink control area, and there are four slots including downlink control areas. The $2^{nd}$ time resource unit range includes 11 slots, the fourth slot, the seventh slot, and the tenth slot do not include a downlink control area, and there are eight slots including downlink control areas. The $3^{rd}$ time resource unit range includes 15 slots, the fourth slot, the seventh slot, and the tenth slot do not include a downlink control area, and there are 12 slots including downlink control areas.

It should be noted that, each time resource unit range includes four slots or four (slots plus mini-slots), and duration of each time resource unit range is a relative value. Therefore, in this example, the timer may be replaced with a counter. In other words, each time resource unit range is corresponding to one counter.

According to the foregoing configuration, performing, by the terminal, the downlink control information monitoring method specifically includes the following:

When the terminal detects, in any time resource unit range, downlink control information used to instruct the terminal to receive or send initially transmitted data, the timer 1, the timer 2, and the timer 3 are simultaneously started. In the five slots in which the timer 1 is effective, the terminal monitors a PDCCH once in each of the first three slots and monitors a PDCCH once in the fifth slot. Because the fourth slot does not include a downlink control area, the terminal enters the short sleep mode in the fourth slot in which the timer 1 is effective, to save power and reduce energy consumption of the terminal. In the 11 slots in which the timer 2 is effective, because the seventh slot and the tenth slot in which the timer 2 is effective do not include a downlink control area, the terminal may turn off the RF link in the seventh slot and the tenth slot, and enter the short sleep mode to save power. In the 11 slots in which the timer 2 is effective, slots in which monitoring needs to be performed in the first five slots are the same as the slots in which monitoring needs to be performed in the five slots in which the timer 1 is effective, and the terminal monitors a PDCCH once every two slots in the last six slots. In the last six slots in which the timer 2 is effective, because the seventh slot and the tenth slot do not include a downlink control area, the terminal may perform monitoring in the sixth slot and the ninth slot in the last six slots in which the timer 2 is effective, or perform monitoring in the eighth slot and the eleventh slot in the last six slots in which the timer 2 is effective. The terminal turns off the RF link in slots in which monitoring is not performed in the last six slots in which the timer 2 is effective, and enters the short sleep mode to save power. The terminal turns off the RF link in slots in which monitoring is not performed in the last six slots in which the timer 2 is effective, and enters the short sleep mode to save power. In the 15 slots in which the timer 3 is effective, slots in which monitoring needs to be performed in the first 11 slots are the same as the slots in which monitoring needs to be performed in the 11 slots in which the timer 2 is effective, and the terminal monitors a PDCCH once every four slots in the last four slots. Similarly, the terminal may perform monitoring in the twelfth slot in which the timer 3 is effective, or may perform monitoring in the fifteenth slot. The terminal turns off the RF link in slots in which monitoring is not performed in the last four slots in which the timer 3 is effective, and enters the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 10, if duration of a DRX on duration period is the same, this application can reduce a frequency of monitoring downlink control information by the terminal when the terminal is in the active mode. During an effective period of any timer, if the terminal does not need to monitor downlink control information in a current slot, the terminal may enter the short sleep mode in the current slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 10, the three timers are configured for the terminal configured with DRX, different manners are used for monitoring downlink control information in the effective periods of the different timers, and performance requirements of reducing power consumption and ensuring scheduling flexibility can be both met.

Figure 16:
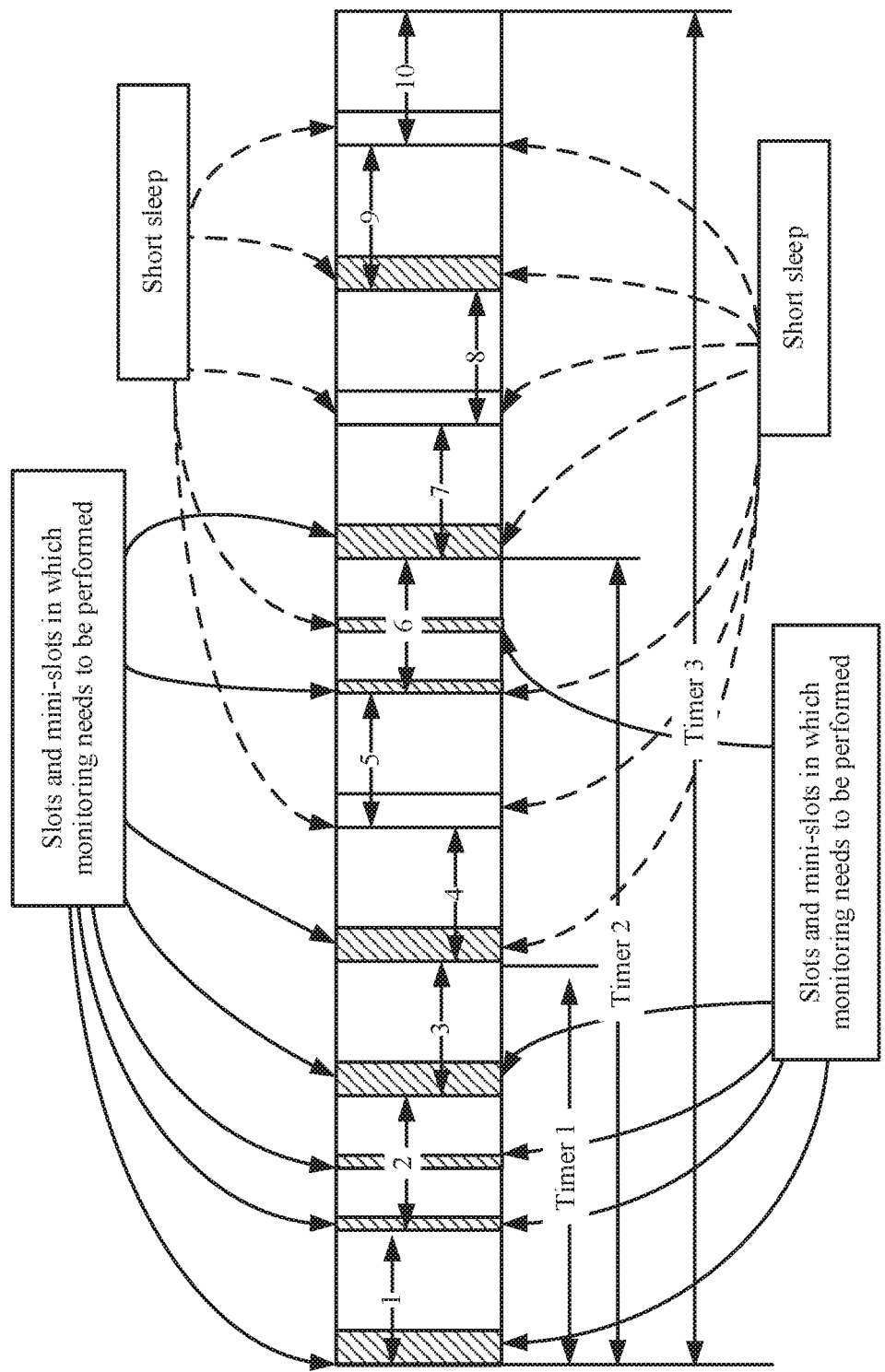
FIG. 16 is a schematic diagram of a downlink control information monitoring method according to Example 11 of this application.

Example 11 provided in this application is shown in FIG. 16. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The terminal is configured to perform slot-based transmission and mini-slot-based transmission.

The $1^{st}$ time resource unit range includes three consecutive slots, the $2^{nd}$ time resource unit range includes six consecutive slots, and the $3^{nd}$ time resource unit range includes 10 consecutive slots. Start moments of the three time resource unit ranges are the same. Monitoring is performed once in each time resource unit in the $1^{st}$ time resource unit range, monitoring is performed once in each time resource unit in an overlapping part of the $2^{nd}$ time resource unit range and the $1^{st}$ time resource unit range, and monitoring is performed once every two time resource units in a non-overlapping part of the $2^{nd}$ time resource unit range and the $1^{st}$ time resource unit range. A monitoring frequency in an overlapping part of the $3^{rd}$ time resource unit range and the $2^{nd}$ time resource unit range is the same as a monitoring frequency in the $2^{nd}$ time resource unit range. Monitoring is performed once every four time resource units in a non-overlapping part of the $3^{rd}$ time resource unit range and the $2^{nd}$ time resource unit range. A quantity of time resource units in each time resource unit range is a sum of quantities of slots and mini-slots in the time resource unit range. The UE is configured to perform slot-based transmission and mini-slot-based transmission. The timer 1, the timer 2, and the timer 3 are simultaneously started.

A difference from Example 8 is: The time resource unit ranges include different slots, a sum of quantities of slots and mini-slots included in each time resource unit range is 4, and not all slots include a downlink control area. Specifically, as shown in FIG. 16, the $1^{st}$ time resource unit range includes three slots, and two mini-slot-based transmissions are configured in the second slot in the $1^{st}$ time resource unit range. The $2^{nd}$ time resource unit range includes six slots, two mini-slot-based transmissions are configured in the second slot and the sixth slot each, and the fifth slot does not include a downlink control area. The $3^{rd}$ time resource unit range includes ten slots, and the eighth slot and the tenth slot do not include a downlink control area.

According to the foregoing configuration, performing, by the terminal, the downlink control information monitoring method specifically includes the following:

When the terminal detects, in any time resource unit range, downlink control information used to instruct the terminal to receive or send initially transmitted data, the timer 1, the timer 2, and the timer 3 are simultaneously started. In the three slots in which the timer 1 is effective, the terminal monitors a PDCCH once in the first slot, monitors a PDCCH once in each of the two mini-slots in the second slot, and monitors a PDCCH once in the third slot. In the six slots in which the timer 2 is effective, slots in which monitoring needs to be performed in the first three slots are the same as the slots in which monitoring needs to be performed in the three slots in which the timer 1 is effective, and the terminal monitors a PDCCH once every two slots in the last three slots. In the last three slots in which the timer 2 is effective, because the fifth slot in which the timer 2 is effective does not include a downlink control area, the terminal may perform monitoring in the fourth slot and the first mini-slot configured in the sixth slot in the last three slots in which the timer 2 is effective, or perform monitoring in the second mini-slot configured in the sixth slot in the last three slots in which the timer 2 is effective. In the ten slots in which the timer 3 is effective, slots in which monitoring needs to be performed in the first six slots are the same as the slots in which monitoring needs to be performed in the six slots in which the timer 3 is effective, and the terminal monitors a PDCCH once every four slots in the last four slots. Because the eighth slot and the tenth slot in the $3^{rd}$ time resource unit range do not include a downlink control area, the terminal may perform monitoring in the seventh slot in the last four slots in which the timer 3 is effective. Optionally, the terminal may turn off the RF link in mini-slots in which monitoring is not performed in the six slots in which the timer 2 is effective and the tenth slots in which the timer 3 is effective, and enter the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 11, if duration of a DRX on duration period is the same, this application can reduce a frequency of monitoring downlink control information by the terminal when the terminal is in the active mode. During an effective period of any timer, if the terminal does not need to monitor downlink control information in a current slot or mini-slot, the terminal may enter the short sleep mode in the current slot or mini-slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 11, the three timers are configured for the terminal configured with DRX, different manners are used for monitoring downlink control information in the effective periods of the different timers, and performance requirements of reducing power consumption and ensuring scheduling flexibility can be both met.

Figure 17:
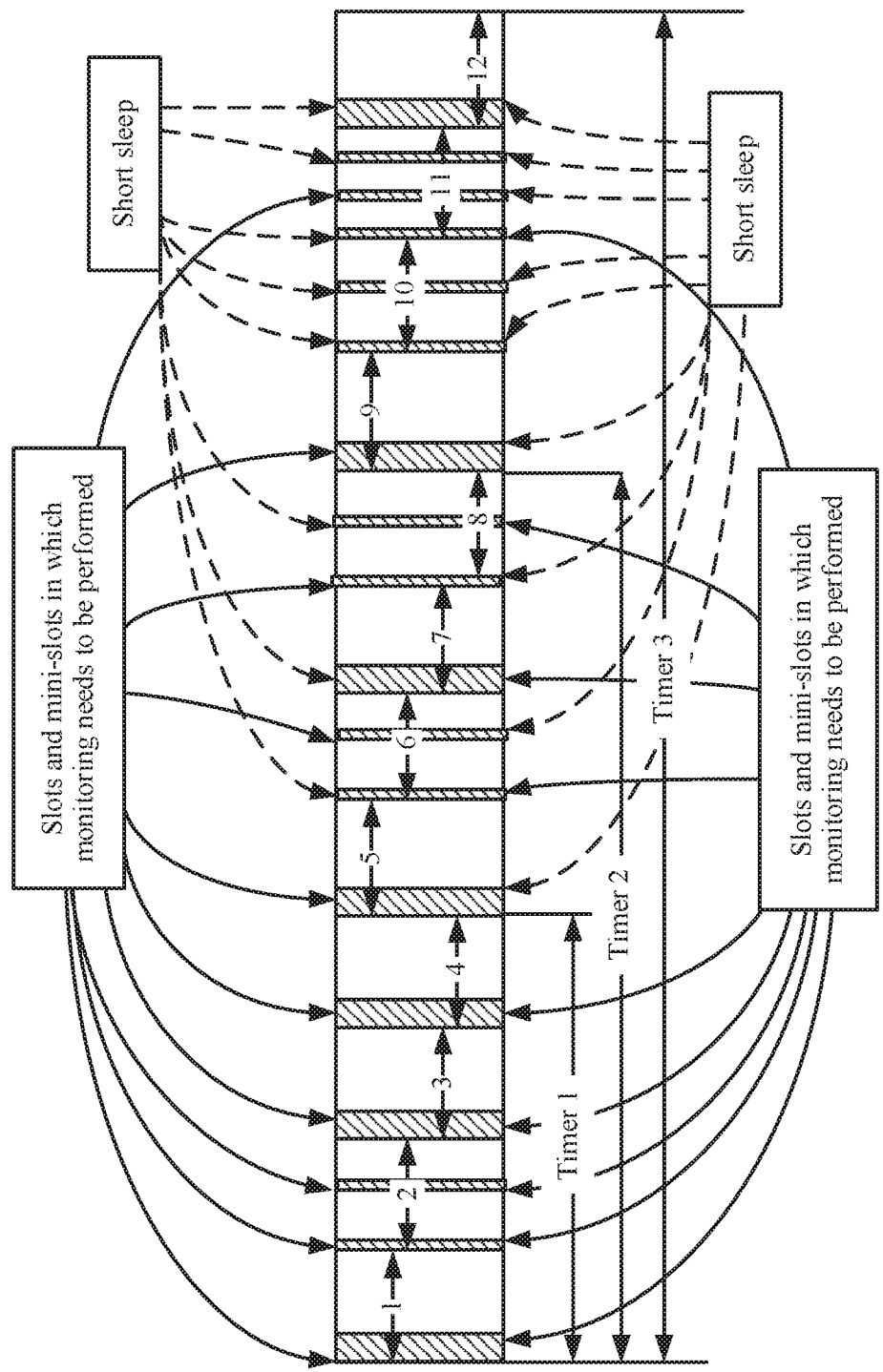
FIG. 17 is a schematic diagram of a downlink control information monitoring method according to Example 12 of this application.

Example 12 provided in this application is shown in FIG. 17. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The terminal is configured to perform slot-based transmission and mini-slot-based transmission.

The $1^{st}$ time resource unit range includes four consecutive slots, the $2^{nd}$ time resource unit range includes eight consecutive slots, and the $3^{rd}$ time resource unit range includes 12 consecutive slots. Start moments of the three time resource unit ranges are the same. Monitoring is performed once in each time resource unit in the $1^{st}$ time resource unit range, monitoring is performed once in each time resource unit in an overlapping part of the $2^{nd}$ time resource unit range and the $1^{st}$ time resource unit range, and monitoring is performed once every two time resource units in a non-overlapping part of the $2^{nd}$ time resource unit range and the $1^{st}$ time resource unit range. Time resource units in which monitoring needs to be performed in an overlapping part of the $3^{rd}$ time resource unit range and the $2^{nd}$ time resource unit range are the same as the time resource units in which monitoring needs to be performed in the $2^{nd}$ time resource unit range. Monitoring is performed once every four time resource units in a non-overlapping part of the $3^{rd}$ time resource unit range and the $2^{nd}$ time resource unit range. A quantity of time resource units in each time resource unit range is a sum of quantities of slots and mini-slots in the time resource unit range. The UE is configured to perform slot-based transmission and mini-slot-based transmission. The timer 1, the timer 2, and the timer 3 are simultaneously started.

A difference from Example 8 is: Not only slot-based transmission is configured in each time resource unit range, but also mini-slot-based transmission is configured in each time resource unit range. Specifically, as shown in FIG. 17, the $1^{st}$ time resource unit range includes four slots, and two mini-slot-based transmissions are configured in the second slot in the $1^{st}$ time resource unit range. The $2^{nd}$ time resource unit range includes eight slots, and two mini-slot-based transmissions are configured in the second slot, the sixth slot, and the eighth slot each. The $3^{rd}$ time resource unit range includes 12 slots, two mini-slot-based transmissions are configured in the second slot, the sixth slot, the eighth slot, and the tenth slot each, and three mini-slot-based transmissions are configured in the eleventh slot.

According to the foregoing configuration, performing, by the terminal, the downlink control information monitoring method specifically includes the following:

When the terminal detects, in any time resource unit range, downlink control information used to instruct the terminal to receive or send initially transmitted data, the timer 1, the timer 2, and the timer 3 are simultaneously started. In the four slots in which the timer 1 is effective, the terminal monitors a PDCCH once in the first slot, monitors a PDCCH once in each of the two mini-slots in the second slot, monitors a PDCCH once in the third slot, and monitors a PDCCH once in the fourth slot. Slots in which monitoring needs to be performed in the first four slots in which the timer 2 is effective are the same as the slots in which monitoring needs to be performed in the four slots in which the timer 1 is effective. The terminal monitors a PDCCH once every two slots or mini-slots in the last four slots in which the timer 2 is effective. The terminal may perform monitoring in the fifth slot, the second mini-slot in the sixth slot, and the first mini-slot in the eighth slot in the last four slots in which the timer 2 is effective, or may perform monitoring in the first mini-slot in the sixth slot, the seventh slot, and the second mini-slot in the eighth slot in the last four slots in which the timer 2 is effective. Slots in which monitoring needs to be performed in the first eight slots in which the timer 2 is effective are the same as the slots in which monitoring needs to be performed in the eight slots in which the timer 2 is effective. The terminal monitors a PDCCH once every four slots or mini-slots in the last four slots in which the timer 3 is effective. The terminal may perform monitoring in the ninth slot and the second mini-slot in the eleventh slot in the last four slots in which the timer 3 is effective, or may perform monitoring in the first mini-slot in the eleventh slot in the last four slots in which the timer 3 is effective. The terminal turns off the RF link in slots or mini-slots in which monitoring is not performed in the eight slots in which the timer 2 is effective and the 12 slots in which the timer 3 is effective, and enters the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 12, if duration of a DRX on duration period is the same, this application can reduce a frequency of monitoring downlink control information by the terminal when the terminal is in the active mode. During an effective period of any timer, if the terminal does not need to monitor downlink control information in a current slot or mini-slot, the terminal may enter the short sleep mode in the current slot or mini-slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 11, the three timers are configured for the terminal configured with DRX, different manners are used for monitoring downlink control information in the effective periods of the different timers, and performance requirements of reducing power consumption and ensuring scheduling flexibility can be both met.

Figure 18:
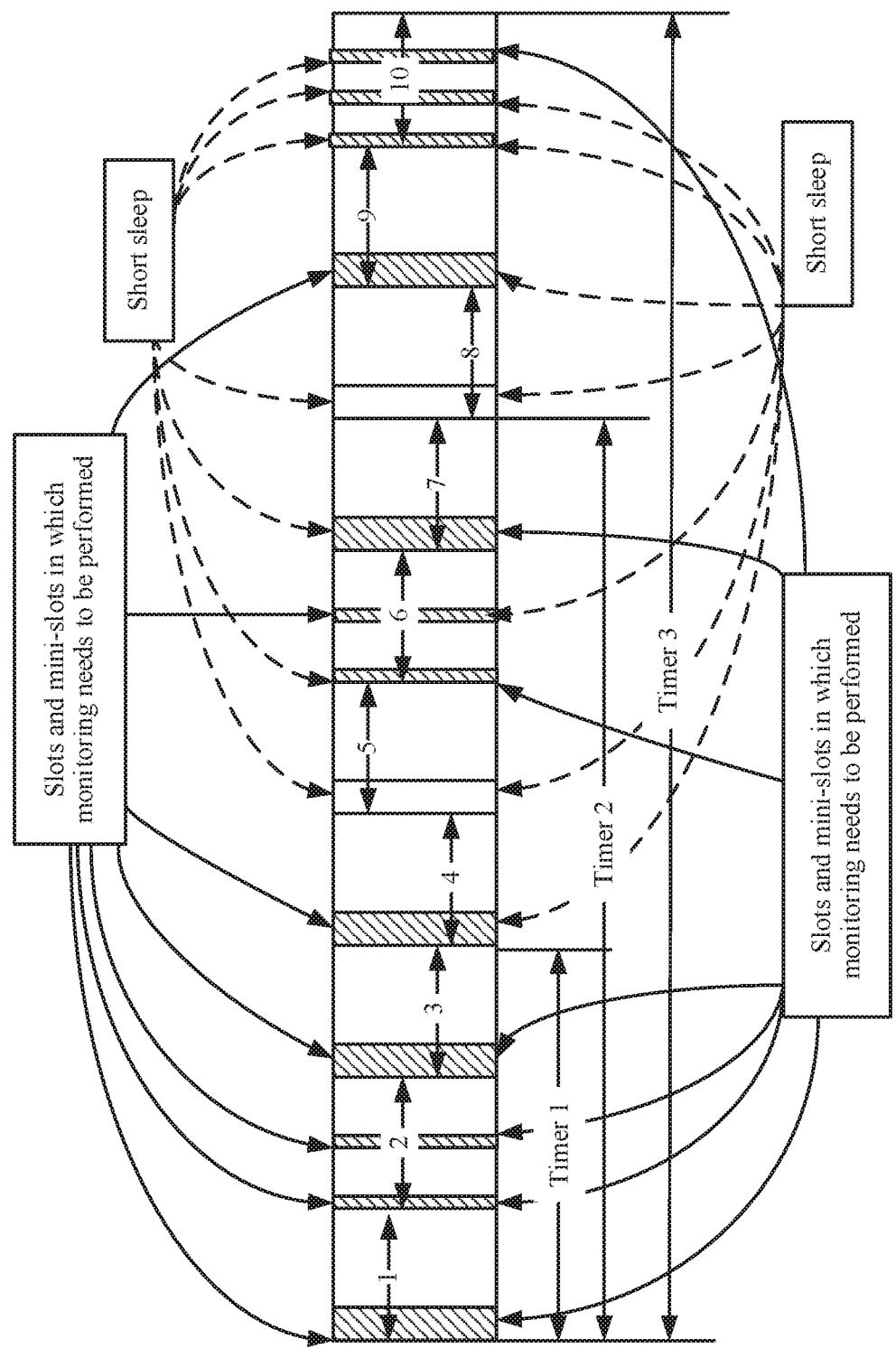
FIG. 18 is a schematic diagram of a downlink control information monitoring method according to Example 13 of this application.

Example 13 provided in this application is shown in FIG. 18. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The terminal is configured to perform slot-based transmission and mini-slot-based transmission.

The $1^{st}$ time resource unit range includes three consecutive slots, the $2^{nd}$ time resource unit range includes seven consecutive slots, and the $3^{rd}$ time resource unit range includes 10 consecutive slots. Start moments of the three time resource unit ranges are the same. Monitoring is performed once in each time resource unit in the $1^{st}$ time resource unit range, monitoring is performed once in each time resource unit in an overlapping part of the $2^{nd}$ time resource unit range and the $1^{st}$ time resource unit range, and monitoring is performed once every two time resource units including downlink control areas in a non-overlapping part of the $2^{nd}$ time resource unit range and the $1^{st}$ time resource unit range. Time resource units in which monitoring needs to be performed in an overlapping part of the $3^{rd}$ time resource unit range and the $2^{nd}$ time resource unit range are the same as the time resource units in which monitoring needs to be performed in the $2^{nd}$ time resource unit range. Monitoring is performed once every four time resource units including downlink control areas in a non-overlapping part of the $3^{rd}$ time resource unit range and the $2^{nd}$ time resource unit range. A quantity of time resource units in each time resource unit range is a sum of quantities of slots and mini-slots including downlink control areas in the time resource unit range. The UE is configured to perform slot-based transmission and mini-slot-based transmission. The timer 1, the timer 2, and the timer 3 are simultaneously started.

A difference from Example 8 is: Not all slots include a downlink control area. Specifically, as shown in FIG. 18, the $1^{st}$ time resource unit range includes three slots, two mini-slot-based transmissions are configured in the second slot, and a sum of a quantity of slots including downlink control areas and a quantity of mini-slots including downlink control areas in each time resource unit range is 4. The $2^{nd}$ time resource unit range includes seven slots; configuration of the first three slots is the same as configuration of the three slots in the $1^{st}$ time resource unit range; in the last four slots in the $2^{nd}$ time resource unit range, two mini-slot-based transmissions are configured in the sixth slot, and the fifth slot does not include a downlink control area; and a sum of a quantity of slots including downlink control areas and a quantity of mini-slots including downlink control areas in the last four slots in the $2^{nd}$ time resource unit range is 4. The $3^{rd}$ time resource unit range includes ten slots; configuration of the first seven slots is the same as configuration of the seven slots in the $2^{nd}$ time resource unit range; in the last three slots in the $3^{rd}$ time resource unit range, the eighth slot does not include a downlink control area, and three mini-slot-based transmissions are configured in the tenth slot; and a sum of a quantity of slots including downlink control areas and a quantity of mini-slots including downlink control areas in the last three slots is 4.

According to the foregoing configuration, performing, by the terminal, the downlink control information monitoring method specifically includes the following:

It should be noted that, each time resource unit range includes four slots including downlink control areas, or a total quantity of slots including downlink control areas and mini-slots including downlink control areas is four, and duration of each time resource unit range is a relative value. Therefore, in this example, the timer may be replaced with a counter. In other words, each time resource unit range is corresponding to one counter.

When the terminal detects, in any time resource unit range, downlink control information used to instruct the terminal to receive or send initially transmitted data, the timer 1, the timer 2, and the timer 3 are simultaneously started. In the three slots in which the timer 1 is effective, the terminal monitors a PDCCH once in the first slot, monitors a PDCCH once in each of the two mini-slots in the second slot, and monitors a PDCCH once in the third slot. Slots in which monitoring needs to be performed in the first three slots in which the timer 2 is effective are the same as the slots in which monitoring needs to be performed in the three slots in which the timer 1 is effective. In the last three slots in which the timer 2 is effective, because the fifth slot in which the timer 2 is effective does not include a downlink control area, the terminal may turn off the RF link in the fifth slot, and enter the short sleep mode to save power. The terminal monitors a PDCCH once every two slots or mini-slots including downlink control areas, and may perform monitoring in the fourth slot and the second mini-slot configured in the sixth slot in the last four slots in which the timer 2 is effective, or may perform monitoring in the first mini-slot configured in the sixth slot and the seventh slot in the last four slots in which the timer 2 is effective. Slots in which monitoring needs to be performed in the first seven slots in which the timer 3 is effective are the same as the slots in which monitoring needs to be performed in the seven slots in which the timer 2 is effective. The terminal monitors a PDCCH once every four slots or mini-slots including downlink control areas in the last three slots in which the timer 3 is effective. Because the eighth slot does not include a downlink control area, the terminal may perform monitoring in the ninth slot in the last three slots in which the timer 3 is effective, or may perform monitoring in the third mini-slot in the tenth slot in the last three slots in which the timer 3 is effective. The terminal turns off the RF link in slots or mini-slots in which monitoring is not performed in the seven slots in which the timer 2 is effective and the ten slots in which the timer 3 is effective, and enters the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 13, if duration of a DRX on duration period is the same, this application can reduce a frequency of monitoring downlink control information by the terminal when the terminal is in the active mode. During an effective period of any timer, if the terminal does not need to monitor downlink control information in a current slot or mini-slot, the terminal may enter the short sleep mode in the current slot or mini-slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 11, the three timers are configured for the terminal configured with DRX, different manners are used for monitoring downlink control information in the effective periods of the different timers, and performance requirements of reducing power consumption and ensuring scheduling flexibility can be both met.

Figure 19:
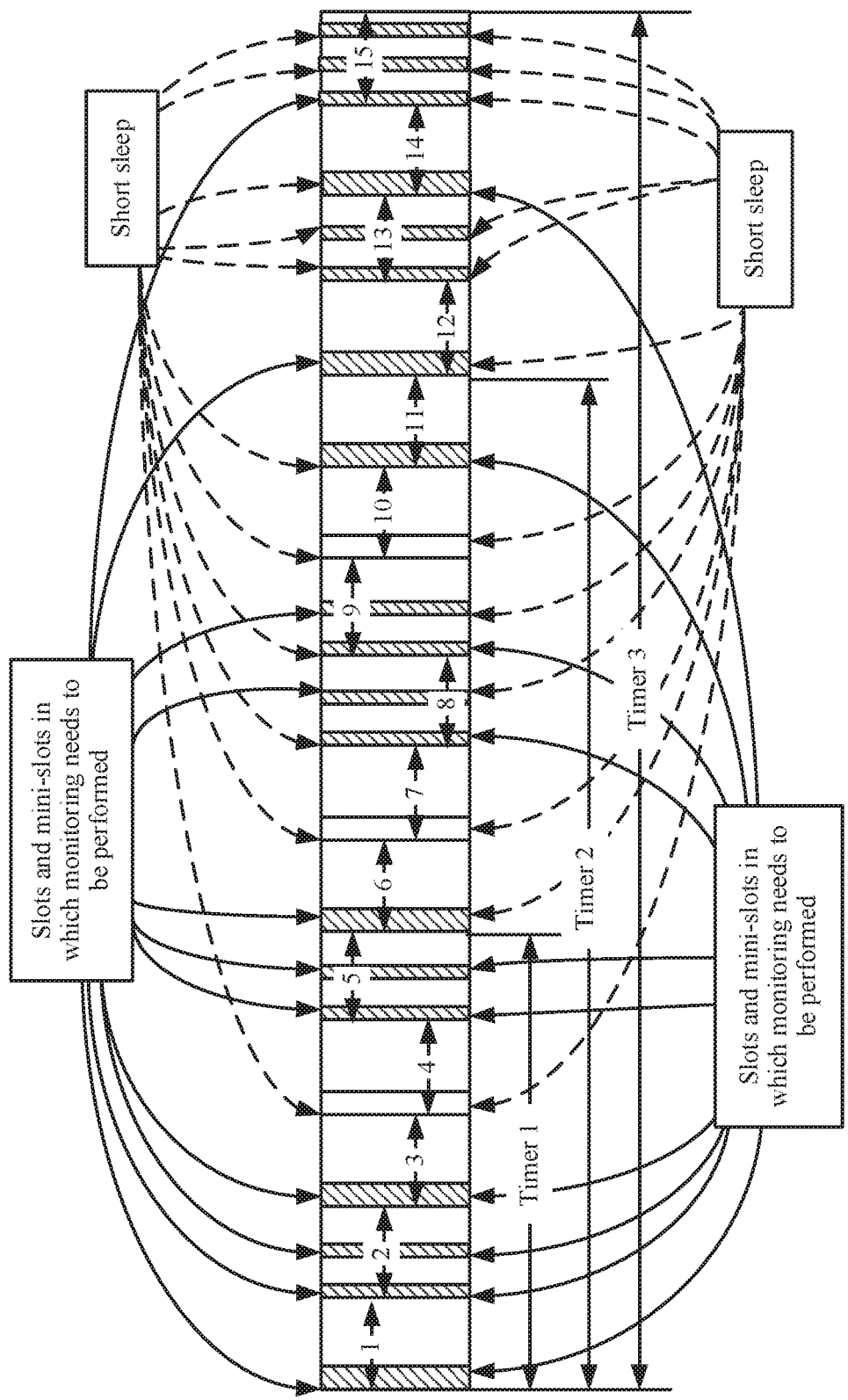
FIG. 19 is a schematic diagram of a downlink control information monitoring method according to Example 14 of this application.

Example 14 provided in this application is shown in FIG. 19. Three time resource unit ranges are configured for the terminal to monitor downlink control information in an on duration period of a DRX cycle, the $1^{st}$ time resource unit range is implemented by a timer 1, the $2^{nd}$ time resource unit range is implemented by a timer 2, and the $3^{rd}$ time resource unit range is implemented by a timer 3. The terminal is configured to perform slot-based transmission and mini-slot-based transmission.

The $1^{st}$ time resource unit range includes five consecutive slots, the $2^{nd}$ time resource unit range includes 11 consecutive slots, and the $3^{rd}$ time resource unit range includes 15 consecutive slots. Start moments of the three time resource unit ranges are the same. Monitoring is performed once in each time resource unit in the $1^{st}$ time resource unit range, monitoring is performed once in each time resource unit in an overlapping part of the $2^{nd}$ time resource unit range and the $1^{st}$ time resource unit range, and monitoring is performed once every two time resource units including downlink control areas in a non-overlapping part of the $2^{nd}$ time resource unit range and the $1^{st}$ time resource unit range. Time resource units in which monitoring needs to be performed in an overlapping part of the $3^{rd}$ time resource unit range and the $2^{nd}$ time resource unit range are the same as the time resource units in which monitoring needs to be performed in the $2^{nd}$ time resource unit range. Monitoring is performed once every four time resource units including downlink control areas in a non-overlapping part of the $3^{rd}$ time resource unit range and the $2^{nd}$ time resource unit range. A quantity of time resource units in each time resource unit range is a sum of quantities of slots and mini-slots including downlink control areas in the time resource unit range. The UE is configured to perform slot-based transmission and mini-slot-based transmission. The timer 1, the timer 2, and the timer 3 are simultaneously started.

A difference from Example 8 is: Each time resource unit range includes four slots including downlink control areas, and not all slots include a downlink control area. As shown in FIG. 19, the $1^{st}$ time resource unit range includes five slots, two mini-slot-based transmissions are configured in the second slot and the fifth slot each, the fourth slot does not include a downlink control area, and a quantity of slots including downlink control areas in the $1^{st}$ time resource unit range is 4. The $2^{nd}$ time resource unit range includes 11 slots; the first five slots in the $2^{nd}$ time resource unit range are the same as the $1^{st}$ time resource unit range; in the last six slots in the $2^{nd}$ time resource unit range, two mini-slot-based transmissions are configured in the eighth slot and the ninth slot each, and the seventh slot and the tenth slot do not include a downlink control area; and a quantity of slots including downlink control areas in the last six slots in the $2^{nd}$ time resource unit range is 4. The $3^{rd}$ time resource unit range includes 15 slots; the first 11 slots in the $3^{rd}$ time resource unit range are the same as the $2^{nd}$ time resource unit range; in the last four slots in the $3^{rd}$ time resource unit range, two mini-slot-based transmissions and three mini-slot-based transmissions are configured in the thirteenth slot and the fifteenth slot respectively; and a quantity of slots including downlink control areas in the last four slots in the $3^{rd}$ time resource unit range is 4.

It should be noted that, each time resource unit range includes four slots including downlink control areas, and duration of each time resource unit range is a relative value. Therefore, in this example, the timer may be replaced with a counter. In other words, each time resource unit range is corresponding to one counter.

According to the foregoing configuration, performing, by the terminal, the downlink control information monitoring method specifically includes the following:

When the terminal detects, in any time resource unit range, downlink control information used to instruct the terminal to receive or send initially transmitted data, the timer 1, the timer 2, and the timer 3 are simultaneously started. In the five slots in which the timer 1 is effective, the terminal monitors a PDCCH once in the first slot, monitors a PDCCH once in each of the two mini-slots in the second slot, monitors a PDCCH once in the third slot, and monitors a PDCCH once in each of the two mini-slots configured in the fifth slot. Because the fourth slot does not include a downlink control area, the terminal may turn off the RF link in the fourth slot, and enter the short sleep mode to save power. Slots in which monitoring needs to be performed in the first five slots in which the timer 2 is effective are the same as the slots in which monitoring needs to be performed in the five slots in which the timer 1 is effective. The terminal monitors a PDCCH once every two slots or mini-slots including downlink control areas in the last six slots in which the timer 2 is effective. The terminal may perform monitoring in the sixth slot, the second mini-slot configured in the eighth slot, and the second mini-slot configured in the ninth slot in the last six slots in which the timer 2 is effective, or may perform monitoring in the first mini-slot configured in the eighth slot, the first mini-slot configured in the ninth slot, and the eleventh slot in the last six slots in which the timer 2 is effective. Slots in which monitoring needs to be performed in the first 11 slots in which the timer 2 is effective are the same as the slots in which monitoring needs to be performed in the 11 slots in which the timer 2 is effective. The terminal monitors a PDCCH once every four slots or mini-slots including downlink control areas in the last four slots in which the timer 3 is effective. The terminal may perform monitoring in the twelfth slot and the first mini-slot in the fifteenth slot in the last four slots in which the timer 3 is effective, or may perform monitoring in the fourteenth slot in the last four slots in which the timer 3 is effective. The terminal turns off the RF link in slots or mini-slots in which monitoring is not performed in the 11 slots in which the timer 2 is effective and the 15 slots in which the timer 3 is effective, and enters the short sleep mode to save power.

Specific content of an offset manner of monitoring a PDCCH by the terminal is the same as that in Example 1, and details are not described herein again.

In an effective period of any timer in the foregoing method procedure, the base station may send signaling to the terminal to instruct to stop monitoring downlink control information, so that the terminal enters an opportunity for DRX period in advance. Specific content is the same as that in Example 1, and details are not described herein again.

Specific content of several manners in which the terminal enters the opportunity for DRX period according to the signaling used to instruct to stop monitoring downlink control information is the same as that in Example 1, and details are not described herein again.

Compared with the existing DRX technology of LTE, in Example 14, if duration of a DRX on duration period is the same, this application can reduce a frequency of monitoring downlink control information by the terminal when the terminal is in the active mode. During an effective period of any timer, if the terminal does not need to monitor downlink control information in a current slot or mini-slot, the terminal may enter the short sleep mode in the current slot or mini-slot to save power and reduce power consumption of the terminal. Compared with the existing technology, when downlink control information monitoring is performed a same quantity of times, this application can prolong the duration of the DRX on duration period without increasing the quantity of times of downlink control information monitoring, and make scheduling more flexible. Therefore, in Example 11, the three timers are configured for the terminal configured with DRX, different manners are used for monitoring downlink control information in the effective periods of the different timers, and performance requirements of reducing power consumption and ensuring scheduling flexibility can be both met.

The embodiments of this application provide a downlink control information monitoring apparatus, to resolve prior-art technical problems that because a discontinuous reception cycle is not configured flexibly, service efficiency is low if an excessively short on duration period is configured and service power consumption is excessively high if an excessively short on duration period is configured. The downlink control information monitoring method and the downlink control information monitoring apparatus provided in the embodiments of this application are based on a same inventive concept. Because problem-resolving principles of the method and the apparatus are similar, mutual reference may be made between implementations of the apparatus and the method, and no repeated description is provided.

Based on a same concept, this application provides a terminal as described above, and the terminal as described above is configured to perform terminal-related method steps in various embodiments of this application. In a possible design, the terminal includes a plurality of functional modules, configured to perform the terminal-related method steps in the various embodiments of this application.

Figure 20:
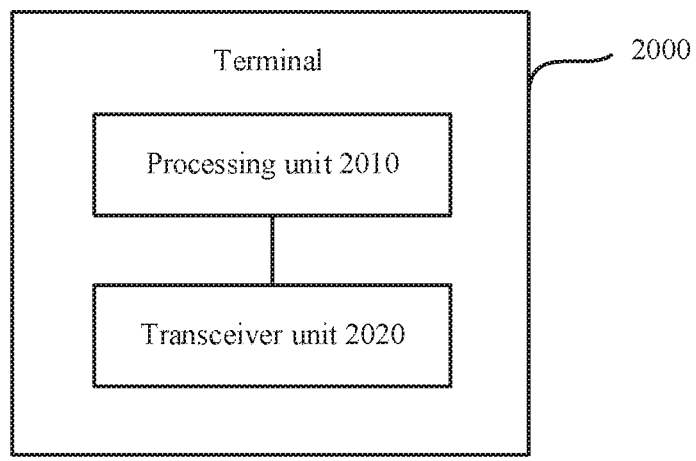
FIG. 20 is a schematic structural diagram of a terminal according to this application.

As shown in FIG. 20, the terminal 2000 includes a processing unit 2010 and a transceiver unit 2020. It should be noted that an operation performed by the processing unit 2010 or the transceiver unit 2020 may be considered as an operation of the terminal 2000.

In a possible design, a structure of the terminal includes a processor and a transceiver. The processor is configured to support the terminal in performing corresponding functions in the foregoing downlink control information monitoring method. The transceiver is configured to: support communication between the terminal and a base station, and send information or an instruction used in the foregoing resource allocation method in the communications system to the base station. The terminal may further include a memory. The memory is coupled to the processor and configured to store a program instruction and data that are necessary for the terminal. The processing unit 2010 in the terminal 2000 may be implemented by the processor in the terminal 2000, and the transceiver unit 2020 may be implemented by the transceiver in the terminal 2000.

Based on a same concept, this application provides a base station as described above, and the base station as described above is configured to perform base-station-related method steps in various embodiments of this application.

Figure 21:
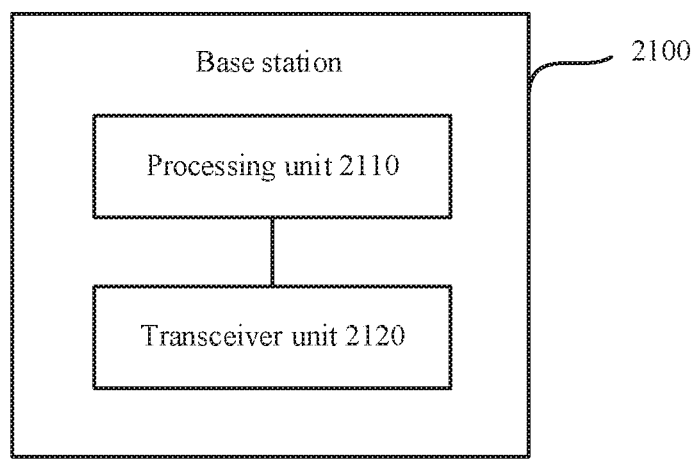
FIG. 21 is a schematic structural diagram of a base station according to this application.

In a possible design, the base station includes a plurality of functional modules, configured to perform the base-station-related method steps in the various embodiments of this application. As shown in FIG. 21, the base station 2100 includes a processing unit 2110 and a transceiver unit 2120. An operation performed by the processing unit 2110 or the transceiver unit 2120 may be considered as an operation of the base station 2100.

In a possible design, a structure of the terminal includes a processor and a transceiver. The processor is configured to support the terminal in performing corresponding functions in the foregoing downlink control information monitoring method. The transceiver is configured to: support communication between the terminal and a base station, and send information or an instruction used in the foregoing resource allocation method in the communications system to the base station. The terminal may further include a memory. The memory is coupled to the processor and configured to store a program instruction and data that are necessary for the terminal. The processing unit 2110 in the base station 2100 may be implemented by the processor in the base station 2100, and the transceiver unit 2120 may be implemented by the transceiver in the base station 2100.

Figure 22:
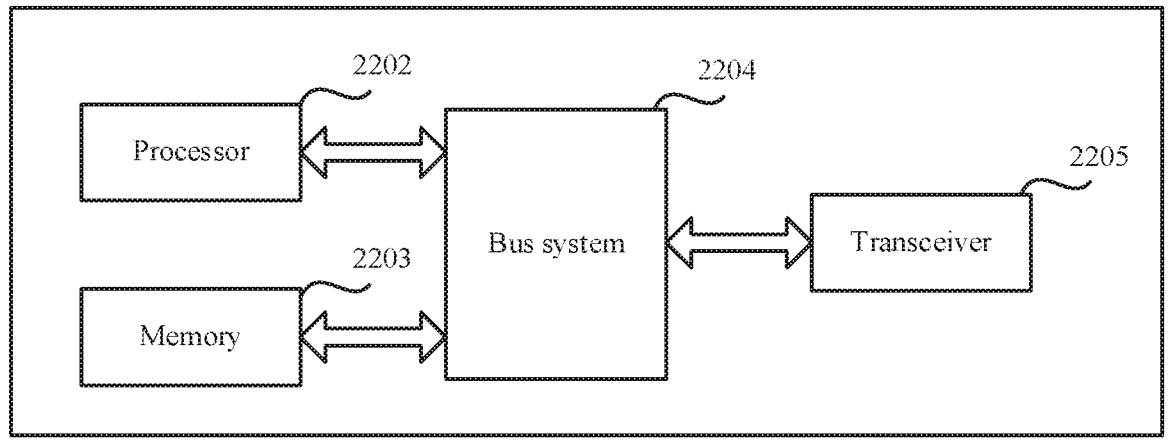
FIG. 22 is a schematic structural diagram of a terminal or a base station according to this application.

It should be noted that, in this embodiment of this application, for a structure relationship of the transceiver, the processor, the memory, and a bus system included in either of the terminal and the base station, refer to FIG. 22. The transceiver 2205 in FIG. 22 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network communications interface, a cellular network communications interface, or a combination thereof.

The processor 2202 in this embodiment of this application may be a central processing unit (English: central processing unit, CPU for short), a network processor (English: network processor, NP for short), or a combination of the CPU and the NP. The processor may further include a hardware chip. The hardware chip may be an application-specific integrated circuit (English: application-specific integrated circuit, ASIC for short), a programmable logic device (English: Programmable Logic Device, PLD for short), or a combination thereof. The PLD may be a complex programmable logic device (English: complex programmable logic device, CPLD for short), a field-programmable gate array (English: field-programmable gate array, FPGA for short), generic array logic (English: generic array logic, GAL for short), or any combination thereof. The memory 2203 may be a volatile memory (English: volatile memory), such as a random-access memory (English: random-access memory, RAM for short); a non-volatile memory (English: non-volatile memory), such as a read-only memory (English: read-only memory, ROM for short), a flash memory (English: flash memory), a hard disk drive (English: hard disk drive. HDD for short), or a solid-state drive (English: solid-state drive, SSD for short), or a combination of the foregoing types of memories.

This embodiment of this application may further include a bus system 2204. The bus system 2204 may include any quantity of interconnected buses and bridges, and specifically connects together circuits that are of one or more processors represented by the processor 2202 and of a memory represented by the memory 2203. A bus may further link various other circuits such as a peripheral device, a voltage stabilizer, and a power management circuit. This is not further described in this application. The transceiver 2205 provides a unit configured to communicate with various other devices on a transmission medium. The processor 2202 is responsible for managing a bus architecture and normal processing. The memory 2203 may store data used when the processor 2202 is performing an operation.

Based on a same concept, this application provides a computer-readable storage medium. The computer-readable storage medium stores an instruction, and when the instruction runs on a computer, the computer performs the terminal-related method steps in various embodiments of this application.

Based on a same concept, this application provides a computer-readable storage medium. The computer-readable storage medium stores an instruction, and when the instruction runs on a computer, the computer performs the base-station-related method steps in various embodiments of this application.

Based on a same concept, this application provides a computer program product including an instruction, and when the instruction runs on a computer, the computer performs the terminal-related method steps in various embodiments of this application.

Based on a same concept, this application provides a computer program product including an instruction, and when the instruction runs on a computer, the computer performs the base-station-related method steps in various embodiments of this application.

A person skilled in the art may clearly know that cross reference may be made between descriptions of the embodiments provided in the present invention. For convenience and conciseness of description, for functions of apparatuses or devices provided in this embodiment of the present invention and steps that are performed in this embodiment of the present invention, refer to related descriptions in the method embodiments of the present invention, and details are not described herein again.

Figure 23:
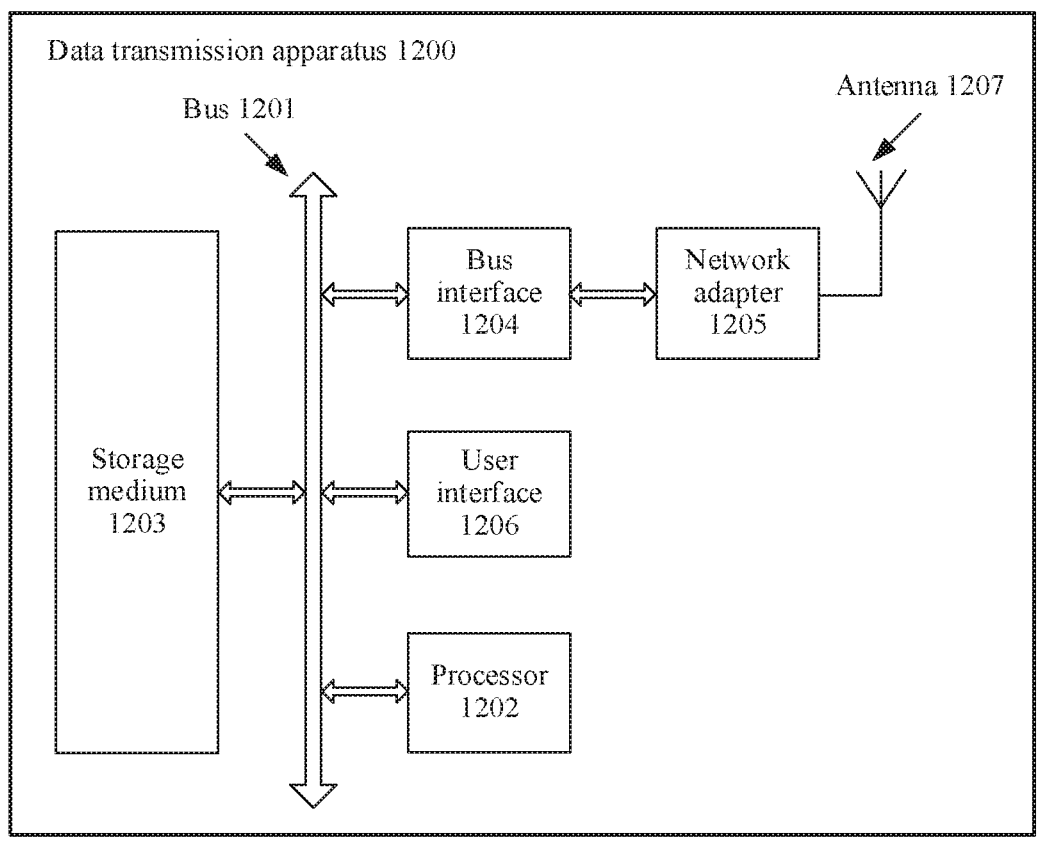
FIG. 23 is a schematic structural diagram of a data transmission apparatus according to this application.

Based on a same inventive concept, an embodiment of this application further provides a data transmission apparatus. FIG. 23 is a schematic structural diagram of the data transmission apparatus (for example, a communications apparatus such as an access point, a base station, a station, or a terminal, or a chip in the foregoing communications apparatus) according to an implementation of the present invention.

As shown in FIG. 23, the data transmission apparatus 1200 may be implemented by using a bus 1201 as a general bus architecture. Based on constraints on specific application and overall design of the data transmission apparatus 1200, the bus 1201 may include any quantity of interconnected buses and bridges. The bus 1201 connects various circuits together, and these circuits include a processor 1202, a storage medium 1203, and a bus interface 1204. Optionally, the data transmission apparatus 1200 uses the bus interface 1204 to connect a network adapter 1205 and the like by using the bus 1201. The network adapter 1205 may be configured to implement a signal processing function of a physical layer in a wireless communications network, and send and receive a radio frequency signal by using an antenna 1207. A user interface 1206 may be connected to a user terminal such as a keyboard, a display, a mouse, or a joystick. The bus 1201 may further connect various other circuits such as a timing source, a peripheral device, a voltage regulator, or a power management circuit. These circuits are well-known in the art, and are not described in detail herein.

Alternatively, the data transmission apparatus 1200 may be configured as a general processing system. For example, the general processing system is usually referred to as a chip. The general processing system includes one or more microprocessors that provide a processor function, and an external memory that provides at least a part of the storage medium 1203. All these components are connected to other supporting circuits by using an external bus architecture.

Alternatively, the data transmission apparatus 1200 may be implemented by using an ASIC (application-specific integrated circuit) having the processor 1202, the bus interface 1204, and the user interface 1206, or by using at least a part of the storage medium 1203 integrated into a single chip. Alternatively, the data transmission apparatus 1200 may be implemented by using one or more FPGAs (field programmable gate arrays), a PLD (programmable logic device), a controller, a state machine, gate logic, a discrete hardware component, any other appropriate circuit, or any combination of circuits that can perform the various functions described throughout the present invention.

The processor 1202 is responsible for managing the bus and general processing (including executing software stored in the storage medium 1203). The processor 1202 may be implemented by using one or more general-purpose processors and/or dedicated processors. Examples of the processor include a microprocessor, a microcontroller, a DSP processor, and another circuit capable of executing the software. The software should be broadly construed as representing an instruction, data, or a combination thereof, regardless of whether it is referred to as software, firmware, middleware, microcode, a hardware description language, or the like.

In FIG. 23, the storage medium 1203 is separated from the processor 1202. However, it is apparent to a person skilled in the art that the storage medium 1203 or any part thereof may be located outside the data transmission apparatus 1200. For example, the storage medium 1203 may include a transmission line, a carrier waveform modulated by using data, and/or a computer product separated from a wireless node. These media are accessible by the processor 1202 by using the bus interface 1204. Alternatively, the storage medium 1203 or any part thereof may be integrated into the processor 1202, for example, may be a cache and/or a general-purpose register.

The processor 1202 may perform the polar code coding/decoding method in any one of the foregoing embodiments of this application. Specific content is not described herein again.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the processes or functions according to the embodiments of the present invention are completely or partially generated. The computer may be a general-purpose computer, a dedicated computer, a computer network, or another programmable apparatus. The computer instruction may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A downlink control information monitoring method implemented by a terminal, comprising:
    monitoring first downlink control information in a first time resource unit range according to a first rule; and
    monitoring second downlink control information in a second time resource unit range according to a second rule, wherein the first time resource unit range is different from the second time resource unit range, wherein the first rule is different from the second rule based on a condition that a first monitoring frequency for monitoring the first downlink control information is different from a second monitoring frequency for monitoring the second downlink control information, and wherein the first monitoring frequency is a reciprocal of a first time resource unit interval used to determine, from a plurality of time resource units corresponding to the first time resource unit range, a first time resource unit in which monitoring needs to be performed, and wherein the second monitoring frequency is a reciprocal of a second time resource unit interval used to determine, from a plurality of time resource units corresponding to the second time resource unit range, a second time resource unit in which monitoring needs to be performed.

2. The downlink control information monitoring method of claim 1, wherein that the first time resource unit range is different from the second time resource unit range comprises a first start moment of the first time resource unit range is different from a second start moment of the second time resource unit a range, a first time length of the first time resource unit range is different from a second time length of the second time resource unit range, or the first start moment is different from the second start moment and the first time length is different from the second time length.

3. The downlink control information monitoring method of claim 1, wherein the first time resource unit range comprises a plurality of first consecutive time resource units, wherein the second time resource unit range comprises a plurality of second consecutive time resource units, and wherein the first time resource unit and the second time resource unit is one or a combination of a slot, a mini-slot, a symbol or a subframe.

4. The downlink control information monitoring method of claim 2, further comprising:
  detecting, in a current time resource unit, that the first downlink control information or the second downlink control information instructs the terminal to receive or send initially transmitted data; and
  determining either (a) the first start moment and the first time length or (b) the second start moment and the second time length.

5. The downlink control information monitoring method of claim 4, further comprising:
  determining first configuration information, wherein the first configuration information is configured by a base station or preconfigured by the terminal, and wherein the first configuration information is configured to configure a relative start moment and time length of either of the first time resource unit range or the second time resource unit range; and
  determining, based on the current time resource unit, the first configuration information and a plurality of consecutive time resource units after the current time resource unit, either (a) the first start moment and the first time length or (b) the second start moment and the second time length.

6. The downlink control information monitoring method of claim 2, wherein when the first start moment is different from the second start moment, a monitoring frequency in a time resource unit range with a later start moment is lower than or equal to a monitoring frequency in a time resource unit range with an earlier start moment.

7. The downlink control information monitoring method of claim 2, wherein when the first start moment is the same as the second start moment a monitoring frequency in an overlapping time resource unit range of the first time resource unit range and the second time resource unit range is higher than or equal to a monitoring frequency in a non-overlapping time resource unit range.

8. A device, comprising:
  a processor; and
  a memory coupled to the processor and configured to store programming instructions that, when executed by the processor, cause the device to:
    monitor first downlink control information in a first time resource unit range according to a first rule; and
    monitor second downlink control information in a second time resource unit range according to a second rule, wherein the first time resource unit range is different from the second time resource unit range, wherein the first rule is different from the second rule based on a condition that a first monitoring frequency for monitoring the first downlink control information is different from a second monitoring frequency for monitoring the second downlink control information, wherein the first monitoring frequency is a reciprocal of a first time resource unit interval used to determine, from a plurality of time resource units corresponding to the first time resource unit range, a first time resource unit in which monitoring needs to be performed, and wherein the second monitoring frequency is a reciprocal of a second time resource unit interval used to determine, from a plurality of time resource units corresponding to the second time resource unit range, a second time resource unit in which monitoring needs to be performed.

9. The device of claim 8, wherein that the first time resource unit range is different from the second time resource unit range comprises a first start moment of the first time resource unit range is different from a second start moment of the second time resource unit range, a first time length of the first time resource unit range is different from a second time length of the second time resource unit range or the first start moment is different from the second start moment and the first time length is different from the second time length.

10. The device of claim 8, wherein the first time resource unit range comprises a plurality of first consecutive time resource units, wherein the second time resource unit range comprises a plurality of second consecutive time resource units, and wherein the first time resource unit and the second resource unit is one or a combination of a slot, a mini-slot, a symbol or a subframe.

11. The device of claim 9, wherein the programming instructions that, when executed by the processor, further cause the device to:
  detect, in a current time resource unit, that the first downlink control information or the second downlink control information instructs the device to receive or send initially transmitted data; and
  determine either (a) the first start moment and the first time length or (b) the second start moment and the second time length.

12. The device of claim 11, wherein the programming instructions that, when executed by the processor, further cause the device to:
  determine first configuration information, wherein the first configuration information is configured by a base station or preconfigured by the device, and wherein the first configuration information is configured to configure a relative start moment and time length of either of the first time resource unit range or the second time resource unit range; and
  determine, based on the current time resource unit, the first configuration information and a plurality of consecutive resource units after the current time resource unit, either (a) the start moment and the first time length or (b) the second start moment and the second time length.

13. The device of claim 9, wherein when the first start moment is different from the second start moment a monitoring frequency in a time resource unit range with a later start moment is lower than or equal to a monitoring frequency in a time resource unit range with an earlier start moment.

14. The device of claim 9, wherein when the first start moment is the same as the second start moment, a monitoring frequency in an overlapping time resource unit range of the first time resource unit range and the second time resource unit range is higher than or equal to a monitoring frequency in a non-overlapping time resource unit range.

15. A computer program product comprising computer-executable instructions for storage on a non-transitory computer-readable medium that, when executed by a processor, cause a device to perform:
  monitor first downlink control information in a first time resource unit range according to a first rule; and
  monitor second downlink control information in a second time resource unit range according to a second rule, wherein the first time resource unit range is different from the second time resource unit range, wherein the first rule is different from the second rule based on a condition that a first monitoring frequency for monitoring the first downlink control information is different from a second monitoring frequency for monitoring the second downlink control information, wherein a first monitoring frequency is a reciprocal of a first time resource unit interval used to determine, from a plurality of time resource units corresponding to the first time resource unit range, a first time resource unit in which monitoring needs to be performed, and wherein the second monitoring frequency is a reciprocal of a second time resource unit interval used to determine, from a plurality of time resource units corresponding to the second time resource unit range, a second time resource unit in which monitoring needs to be performed.

16. The computer program product of claim 15, wherein that the first time resource unit range is different from the second time resource unit range comprises a first start moment of the first time resource unit range is different from a second start moment of the second time resource unit range, a first time length of the first time resource unit range is different from a second time length of the second time resource unit range, or the first start moment is different from the second start moment and the second time length is different from the second time length.

17. The computer program product of claim 15, wherein the first time resource unit range comprises a plurality of first consecutive time resource units, wherein the second time resource unit range comprises a plurality of second consecutive time resource units, and wherein the first time resource unit and the second time resource unit is one or a combination of a slot, a mini-slot, a symbol or a subframe.

18. The computer program product of claim 16, wherein the computer-executable instructions further cause the device to:

detect, in a current time resource unit, that the first downlink control information or the second downlink control information instructing the device to receive or send initially transmitted data; and determine either (a) the first start moment and the first time length or (b) the second start moment and the second time length.

19. The computer program product of claim 18, wherein the computer-executable instructions further cause the device to:

determine first configuration information, wherein the first configuration information is configured by a base station or preconfigured by the device, and wherein the first configuration information is configured to configure a relative start moment and time length of either of the first time resource unit range or the second time resource unit range; and determine, based on the current time resource unit, the first configuration information and a plurality of consecutive time resource units after the current time resource unit, either (a) the first start moment and the first time length or (b) the second start moment and the second time length.

20. The computer program product of claim 16, wherein when the first start moment is different from the second start moment, a monitoring frequency in a time resource unit range with a later start moment is lower than or equal to a monitoring frequency in a time resource unit range with an earlier start moment.

* * * * *